United States Patent
Sorgard et al.

(10) Patent No.: US 10,657,681 B2
(45) Date of Patent: May 19, 2020

(54) METHOD OF AND APPARATUS FOR PROCESSING GRAPHICS

(71) Applicant: ARM NORWAY AS, Trondheim (NO)

(72) Inventors: Edvard Sorgard, Trondheim (NO); Borgar Ljosland, Trondheim (NO); Jorn Nystad, Trondheim (NO); Mario Blazevic, Lena (NO); Frank Langtind, Tiller (NO)

(73) Assignee: ARM NORWAY AS, Trondheim (NO)

( * ) Notice: Subject to any disclaimer, the term of this patent is extended or adjusted under 35 U.S.C. 154(b) by 0 days.

(21) Appl. No.: 16/007,145

(22) Filed: Jun. 13, 2018

(65) Prior Publication Data

US 2018/0293765 A1    Oct. 11, 2018

Related U.S. Application Data

(60) Division of application No. 14/854,525, filed on Sep. 15, 2015, now Pat. No. 10,019,820, which is a
(Continued)

(30) Foreign Application Priority Data

Dec. 5, 2005    (GB) .................................. 0524804.2

(51) Int. Cl.
*G06T 11/20*        (2006.01)
*G06T 1/60*         (2006.01)
(Continued)

(52) U.S. Cl.
CPC ................ *G06T 11/20* (2013.01); *G06K 9/46* (2013.01); *G06K 9/6201* (2013.01); *G06T 1/20* (2013.01);
(Continued)

(58) Field of Classification Search
CPC ....................................................... G06T 11/20
(Continued)

(56) References Cited

U.S. PATENT DOCUMENTS

| 5,150,454 A | 9/1992 | Wood |
| 5,175,808 A | 12/1992 | Sayre |

(Continued)

FOREIGN PATENT DOCUMENTS

| CN | 1641702 | 7/2005 |
| EP | 1 351 195 | 10/2003 |

(Continued)

OTHER PUBLICATIONS

U.S. Appl. No. 11/987,265, filed Nov. 28, 2007, Sorgard et al.
(Continued)

*Primary Examiner* — Javid A Amini
(74) *Attorney, Agent, or Firm* — Nixon & Vanderhye P.C.

(57) ABSTRACT

A scene to be rendered is divided into plural individual sub-regions or tiles. The individual sub-regions 51 are also grouped into differing groups of sets of plural sub-regions. There is a top level layer comprising a set of 8×8 sub-regions which encompasses the entire scene area. There is then a group of four 4×4 sets of sub-regions, then a group of sixteen 2×2 sets of sub-regions, and finally a layer comprising the 64 single sub-regions. A primitive list building processor takes each primitive in turn, determines a location for that primitive, compares the primitive's location with the locations of the sub-regions and the locations of the sets of sub-regions, and allocates the primitive to respective primitive lists for the sub-regions and sets of sub-regions accordingly.

10 Claims, 5 Drawing Sheets

Related U.S. Application Data continuation of application No. 11/633,647, filed on Dec. 5, 2006, now abandoned.

(51) Int. Cl.
| | | |
|---|---|---|
| *G06T 7/70* | (2017.01) | |
| *G06T 15/00* | (2011.01) | |
| *G06K 9/46* | (2006.01) | |
| *G06K 9/62* | (2006.01) | |
| *G06T 1/20* | (2006.01) | |
| *G06T 17/10* | (2006.01) | |

(52) U.S. Cl.
CPC .................. *G06T 1/60* (2013.01); *G06T 7/70* (2017.01); *G06T 15/00* (2013.01); *G06T 17/10* (2013.01); *G06K 2009/4666* (2013.01); *G06T 2200/04* (2013.01)

(58) Field of Classification Search
USPC ........................................................ 345/420
See application file for complete search history.

(56) References Cited

U.S. PATENT DOCUMENTS

| | | | |
|---|---|---|---|
| 5,305,430 | A | 4/1994 | Glassner |
| 5,392,385 | A | 2/1995 | Evangelisti et al. |
| 5,500,928 | A * | 3/1996 | Cook .................... G06K 15/02 345/619 |
| 5,509,110 | A | 4/1996 | Latham |
| 5,522,018 | A | 5/1996 | Takeda et al. |
| 5,555,358 | A | 9/1996 | Blumer |
| 5,574,836 | A | 11/1996 | Broemmelsiek |
| 5,596,685 | A | 1/1997 | Ashton |
| 5,729,672 | A | 3/1998 | Ashton |
| 5,844,571 | A | 12/1998 | Narayanaswami |
| 5,886,701 | A | 3/1999 | Chauvin et al. |
| 5,949,428 | A | 9/1999 | Toelle et al. |
| 6,204,856 | B1 | 3/2001 | Wood et al. |
| 6,288,722 | B1 | 9/2001 | Narayanaswami |
| 6,304,266 | B1 | 10/2001 | Li |
| 6,326,964 | B1 * | 12/2001 | Snyder .................. G06T 11/001 345/419 |
| 6,344,852 | B1 | 2/2002 | Zhu et al. |
| 6,552,723 | B1 | 4/2003 | Duluk et al. |
| 6,697,063 | B1 | 2/2004 | Zhu |
| 6,798,410 | B1 | 9/2004 | Redshaw et al. |
| 6,911,985 | B1 | 6/2005 | Fujimoto |
| 7,002,571 | B2 | 2/2006 | Lake et al. |
| 7,138,998 | B2 | 11/2006 | Forest et al. |
| 7,148,890 | B2 | 12/2006 | Rice et al. |
| 7,167,171 | B2 | 1/2007 | Heim et al. |
| 7,324,115 | B2 | 1/2008 | Fraser |
| 7,418,156 | B1 | 8/2008 | Candela et al. |
| 8,681,168 | B2 | 3/2014 | Nystad et al. |
| 8,928,667 | B2 | 1/2015 | Nystad et al. |
| 9,965,886 | B2 | 5/2018 | Sorgard et al. |
| 2002/0015064 | A1 | 2/2002 | Robotham et al. |
| 2003/0142100 | A1 | 7/2003 | Lavelle et al. |
| 2003/0151608 | A1 | 8/2003 | Chung et al. |
| 2003/0227457 | A1 | 12/2003 | Pharr et al. |
| 2004/0066384 | A1 | 4/2004 | Ohba |
| 2004/0095343 | A1 | 5/2004 | Forest et al. |
| 2004/0227767 | A1 | 11/2004 | Baroncelli et al. |
| 2006/0072831 | A1 | 4/2006 | Pallister |
| 2006/0129908 | A1 | 6/2006 | Markel |
| 2006/0170693 | A1 | 8/2006 | Bethune et al. |
| 2007/0101013 | A1 | 5/2007 | Howson |
| 2007/0146378 | A1 | 6/2007 | Sorgard et al. |
| 2007/0165035 | A1 | 7/2007 | Duluk |
| 2008/0012878 | A1 | 1/2008 | Nystad et al. |
| 2008/0150950 | A1 | 6/2008 | Sorgard et al. |
| 2008/0170066 | A1 | 7/2008 | Falchetto |
| 2010/0177105 | A1 | 7/2010 | Nystad |
| 2011/0280307 | A1 | 11/2011 | MacInnis |

FOREIGN PATENT DOCUMENTS

| | | |
|---|---|---|
| GB | 2 251 770 | 7/1992 |
| GB | 2 281 682 | 3/1995 |
| GB | 2 298 111 | 8/1996 |
| GB | 2 343 603 | 5/2000 |
| GB | 2 433 014 | 6/2007 |
| GB | 2 444 628 | 6/2008 |
| GB | 2 444 863 | 6/2008 |
| JP | 2002-526842 | 8/2002 |
| JP | 2003-296747 | 10/2003 |
| JP | 2003-529859 | 10/2003 |
| JP | 2004-348702 | 12/2004 |
| JP | 2004-537129 | 12/2004 |
| JP | 2006-521612 | 9/2006 |
| JP | 2007-157155 | 6/2007 |
| JP | 2008-165760 | 7/2008 |
| WO | WO 90/06561 | 6/1990 |
| WO | WO 95/28685 | 10/1995 |
| WO | WO 97/06512 | 2/1997 |
| WO | WO 98/29838 | 7/1998 |
| WO | WO 00/19377 | 4/2000 |
| WO | WO 00/28483 | 5/2000 |
| WO | WO 01/75803 | 10/2001 |
| WO | WO 01/95257 | 12/2001 |
| WO | WO 03/010717 | 2/2003 |
| WO | WO 2004/066059 | 8/2004 |
| WO | WO 2004/086309 | 10/2004 |
| WO | WO 2005/020582 | 3/2005 |
| WO | WO 2005/116930 | 12/2005 |

OTHER PUBLICATIONS

U.S. Appl. No. 14/854,525, filed Sep. 15, 2015, Sorgard et al.
M. Olano et al "Triangle Scan Conversion using 2D Homogeneous Coordinates" Proceedings of the ACM SIGGRAPH/Eurographics Workshop on Graphics, Aug. 1997, pp. 89-95.
M. Cox et al, "Architectural Implications of Hardware-Accelerated Bucket Rendering on the PC" Proceedings of the ACM SIGGRAPH/ Eurographics Workshop on Graphics, Aug. 1997, pp. 25-34.
J. Pineda, "A Parallel Algorithm for Polygon Rasterization" Computer Graphics, vol. 22, No. 4, Aug. 1988, pp. 17-20.
J. Foley et al, Computer Graphics, Second edition, 1990, pp. 668-672.
United Kingdom Intellectual Property Office Search Report and Examination Report dated Apr. 16, 2009 in corresponding Great Britain Application No. GB0900700.6, 4 pages.
United Kingdom Intellectual Property Office Search Report and Examination Report dated May 11, 2010 in corresponding Great Britain Application No. GB1000710.2, 6 pages.
Maurice Ribble, gdc2008, Next-Gen Tile-Based GPUs, Feb. 18-22, 2008; San Francisco, 36 pages.
Jason Cross Publication, Intel Lifts the Larrabee Veil a Little, Tile Rendering is Back-CPUs, Boards & Components by Extreme Tech.mht. Aug. 4, 2008, 4 pages.
Crisu et al., 3D Graphics Tile-Based Systolic Scan-Conversion, downloaded Feb. 2010, pp. 517-521.
Crisu et al., Efficient Hardware for Antialiasing Coverage Mask Generation, Jun. 2004, pp. 1-8, (Proceedings of the Computer Graphics International).
Crisu et al., Efficient Hardware for Tile-Based Rasterization, Nov. 2004, pp. 352-357.
Greene et al., Hierarchical Polygon Tiling with Coverage Masks, Jun. 20, 1995, pp. 65-76.
Zone Rendering—Whitepaper, Document No. 298587-001, May 2002, pp. 1-15.
Kim Jeong Hyun, Hardware-Driven Visibility Culling paper, Document No. 20073114, pp. 1-7, 2007, (http://jupiter.kaist.ac.kr/~sungeui/ SGA07/).
First Office Action dated Sep. 23, 2011 in CN 200710306692.2 (8 pages).
English translation of Second Office Action dated Jan. 4, 2012 in CN 200610130945.0, 8 pages.
English translation of Third Office Action dated May 14, 2012 in CN 200610130945.0, 29 pages.

(56) References Cited

OTHER PUBLICATIONS

JP Office Action and English translation dated Aug. 28, 2012 in JP 2007-314022, 6 pages.
Chinese Office Action and English translation dated Dec. 12, 2012 in CN 200610130945.0, 15 pages.
Japanese Office Action and English Translation of Japanese Office Action dated Oct. 22, 2013 in JP 2010-005906, 9 pages.
Examiner's Answer dated Jun. 23, 2015 in U.S. Appl. No. 11/987,265, 18 pages.
Final Office Action dated Jun. 16, 2014 in U.S. Appl. No. 11/987,265, 20 pages.
Final Office Action dated Aug. 7, 2013 in U.S. Appl. No. 11/987,265, 18 pages.
Office Action dated Jan. 24, 2013 in U.S. Appl. No. 11/987,265, 16 pages.
Final Office Action dated Apr. 9, 2012 in U.S. Appl. No. 11/987,265, 16 pages.
Office Action dated Nov. 18, 2011 in U.S. Appl. No. 11/987,265, 22 pages.
PTAB Decision dated Jul. 16, 2015 in U.S. Appl. No. 11/633,647, 10 pages.
Examiner's Answer dated Mar. 16, 2012 in U.S. Appl. No. 11/633,647, 13 pages.
Final Office Action dated May 24, 2011 in U.S. Appl. No. 11/633,647, 11 pages.
Office Action dated Jul. 22, 2010 in U.S. Appl. No. 11/633,647, 13 pages.
Final Office Action dated Jan. 26, 2010 in U.S. Appl. No. 11/633,647, 9 pages.
Office Action dated May 19, 2009 in U.S. Appl. No. 11/633,647, 9 pages.
Office Action dated Aug. 3, 2017 in co-pending U.S. Appl. No. 14/854,525, 14 pages.

* cited by examiner

METHOD OF AND APPARATUS FOR PROCESSING GRAPHICS

This application is a Divisional of U.S. patent application Ser. No. 14/854,525, filed Sep. 15, 2015, which is a Continuation of U.S. patent application Ser. No. 11/633,647, filed Dec. 5, 2006 which claims priority to GB Application No. 0524804.2 filed Dec. 5, 2005, the entire contents of each of which are hereby incorporated by reference in this application.

The present invention relates to a method of and apparatus for processing graphics, and in particular to such a method and apparatus for use in a tile-based graphics processing system.

The present invention will be described with particular reference to the processing of three-dimensional graphics, although as will be appreciated by those skilled in the art, it is equally applicable to the processing of two-dimensional graphics as well.

As is known in the art, graphics processing is normally carried out by first splitting the scene to be displayed into a number of similar basic components or "primitives", which primitives are then subjected to the desired graphics processing operations. The graphics "primitives" are usually in the form of simple polygons, such as triangles, and are usually described by defining their vertices.

For the graphics processing operations, each graphics primitive is usually further divided, as is known in the art, into discrete graphic entities or elements, usually referred to as "fragments", on which the actual graphics processing operations (such as rendering operations) are carried out. Each such graphics fragment will represent and correspond to a given position in the primitive and comprise, in effect, a set of data (such as colour and depth values) for the position in question.

Each graphics fragment (data element) usually corresponds to a single pixel (picture element) in the final display (since as the pixels are the singularities in the final picture to be displayed, there will usually be a one-to-one mapping between the "fragments" the graphics processor operates on and the pixels in the display). However, it can be the case that there is not a direct correspondence between "fragments" and "pixels", for example where particular forms of post-processing such as down-scaling are carried out on the rendered image prior to displaying the final image.

Thus two aspects of graphics processing that are typically carried out are the "rasterising" of graphics "primitive" (polygon) position data to graphics fragment position data (i.e. determining the (x, y) positions of the graphics fragments to be used to represent each primitive in the scene to be displayed), and then "rendering" the "rasterised" fragments (i.e. colouring, shading, etc. the fragments) for displaying on a display screen.

(In graphics literature, the term "rasterisation" is sometimes used to mean both primitive conversion to fragments and rendering. However, herein "rasterisation" will be used to refer to converting primitive data to fragment addresses only.)

Many graphics processing systems use so-called "tile-based" rendering. In tile-based rendering, the two-dimensional scene to be displayed is sub-divided or partitioned into a plurality of smaller sub-regions, usually referred to as "tiles". The tiles (sub-regions) are each rendered separately (typically one-after-another). The rendered sub-regions (tiles) are then recombined to provide the complete frame for display. In such arrangements, the scene is typically divided into regularly-sized and shaped sub-regions (tiles) (they are usually e.g., squares or rectangles) but this is not essential.

Other terms that are commonly used for "tiling" and "tile-based" rendering include "chunking" (the sub-regions are referred to as "chunks") and "bucket" rendering. The terms "tile" and "tiling" will be used hereinafter for convenience, but it should be understood that these terms are intended to encompass all alternative and equivalent terms and techniques.

The advantage of such tile-based rendering is that primitives that do not appear in a given tile do not have to be processed for that tile, and therefore can be ignored when the tile is processed. This allows the overall amount of graphics processing necessary for a given scene to be reduced.

In a tile-based rendering system, it is accordingly usually desirable to be able to identify and know those primitives that are actually present in a given sub-region (tile), so as to, e.g., avoid unnecessarily rendering primitives that are not actually present in a tile. In order to facilitate this, it is known to prepare for each sub-region (tile) a list of the primitives to be rendered for that sub-region (e.g. that will appear in the sub-region). Such a "tile-list" (which can also be referred to as a "primitive list") identifies (e.g. by reference to a primitive indicator) the primitives to be rendered for the tile (sub-region) in question.

The process of preparing tile lists for each sub-region (tile) to be rendered basically therefore involves determining the primitives that should be rendered for a given sub-region (tile). This process is usually carried out by determining (at a desired level of accuracy) the primitives that intersect (i.e. that will appear (at least in part) within) the tile in question, and then preparing a list of those primitives for future use by the graphics processing system. (It should be noted here that where a primitive falls into more than one tile (as will frequently be the case), it is included in the tile list for each tile that it falls within.) In effect, each sub-region (tile) can be considered to have a bin (the tile-list) into which any primitive that is found to fall within (i.e. intersect) the sub-region is placed (and, indeed, the process of sorting the primitives on a tile-by-tile basis in this manner is commonly referred to as "binning").

As known in the art, the process of determining the primitives that should be listed (rendered) for any given tile can be carried out at varying levels of precision, for example depending on efficiency optimisations for different parts of the tiling and rendering processes. For example, at the most precise level, it could be determined exactly which tiles a given primitive will appear at least in part in, and the primitive then included in the tile lists for those tiles only. This is commonly referred to as "exact" binning.

FIG. 1 illustrates the exact binning process. As shown in FIG. 1, the scene 1 to be displayed is divided into sixteen regularly sized sub-regions or tiles 2. It is then determined for each primitive in the scene, which tile or tiles the primitive actually appears (falls) within. The primitive is added to the tile-list for each tile that it is found to fall within. Thus, taking the example shown in FIG. 1, the primitive 3 is added to the tile-list for tile 4, the primitive 5 is included in the tile-list for tiles 6 and 7, the primitive 8 is included in the tile lists for tiles 9, 10, 11 and 12, and the primitive 13 is included in the tile-list for tile 12. (It should be noted here that FIG. 1 shows only a few tiles and primitives for clarity purposes. As will be appreciated by those skilled in the art, in an actual graphics processing operation, there will typically be many more primitives and tiles.)

It is also known to prepare tile-lists with a lower precision than is achieved with exact binning. This can be useful to, e.g., simplify the preparation of the tile-lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part).

This arrangement thus uses a bounding box to determine the tiles for which a given primitive should be listed to be rendered, rather than the primitive itself. This can mean, e.g., that a primitive may be listed for rendering for a tile that it does not actually fall within (e.g. if the bounding box does not sufficiently tightly or precisely surround the primitive), but on the other hand, the use of bounding boxes in this manner can simplify the preparation of the tile-lists.

Once lists of primitives to be rendered (tile-lists) have been prepared for each sub-region (tile) in this way, the (tile-)lists are stored for use, e.g., to allow the system to identify which primitives need to be considered (and rendered) when the tile in question is rendered.

Such tile-based rendering arrangements have been found to work well, as they can, for example, help to avoid primitives still being processed for regions of the scene where they are not present.

However, one drawback with the need to prepare and store tile-lists identifying the primitives to be rendered for each tile is that depending on the distribution of the primitives in a scene, the tile-lists for different tiles in a scene can be very different sizes, as can the tile lists for tiles in different scenes. This means that, e.g., a given scene or tile may have significantly different memory requirements for storing its tile list(s) as compared to other tiles or scenes. This means that, e.g., the memory requirements for the tile lists cannot be reliably predicted and will vary, e.g., depending on the distribution of primitives in a given scene. However, it is generally beneficial in graphics systems, particularly where they are to be implemented on more restricted devices, such as portable devices (e.g. mobile phones, PDAs, handheld devices, etc.), to have known or at least generally predictable memory usage requirements.

The Applicants believe therefore that there remains scope for improvement to existing tile-based rendering systems.

According to a first aspect of the present invention, there is provided an apparatus for sorting graphics primitives for rendering in a graphics processing system in which a scene to be rendered is divided into a plurality of sub-regions for rendering, the apparatus comprising:

means for preparing, for a single sub-region of the scene, a list of primitives for rendering; and means for preparing, for a set of sub-regions comprising more than one sub-region of the scene, a list of primitives for rendering.

According to a second aspect of the present invention, there is provided a method of sorting graphics primitives for rendering in a graphics processing system in which a scene to be rendered is divided into a plurality of sub-regions for rendering, the method comprising preparing, for a single sub-region of the scene, a list of primitives for rendering; and preparing, for a set of sub-regions comprising more than one sub-region of the scene, a list of primitives for rendering.

The present invention is directed to a tile-based rendering system (i.e. one in which the scene to be rendered is divided into plural sub-regions) in which, as in prior art tile-based rendering systems, a list of primitives for rendering can be (and is) prepared for a given sub-region (tile) of the scene. However, unlike in prior art systems, it is also possible in the system of the present invention to prepare a list of primitives for rendering for a set of plural sub-regions (tiles) of the scene (i.e. a tile list that encompasses a plurality of the sub-regions (tiles) (and thereby, in effect, a larger sub-region) of the scene).

In other words, in the present invention, separate (different) tile lists can be (and preferably are) prepared for single sub-regions (tiles) of the scene and for sets of sub-regions comprising more than one sub-region (tile) of the scene. Thus, for example, and preferably, a list of primitives for rendering (a tile list) will be prepared for a single sub-region of the scene, and a separate (different) list of primitives for rendering (tile list) will be prepared for a set of sub-regions comprising more than one sub-region of the scene, and so on.

The possibility of preparing different scene "area" tile lists as in the present invention has a number of advantages. For example, as will be discussed further below, by selectively storing primitives in single sub-region and/or plural sub-region tile lists, the amount of memory that is used for the tile lists can be varied. The present invention accordingly facilitates better control over and knowledge of the memory usage requirements for the tile listing process. Sorting the primitives into different area tile lists can also be used to provide, e.g., information about the distribution of primitives within the scene. This may be useful, e.g., when considering operations such as, e.g., vertex data caching (since it could assist, e.g., in determining whether or not to cache given vertex data).

The arrangement of the present invention means that, as well as preparing tile-lists of primitives that are exclusive to a single tile only, tile-lists that can and will be used for plural tiles (sub-regions) in common can be and are prepared.

In other words, the present invention facilitates the (selective) storing or inclusion of primitives for rendering in tile lists having different resolutions (i.e. for different sized areas), namely, e.g., in a tile list that is exclusive to a single sub-region (tile) only and/or in a tile list that is to be used for more than one sub-region (tile) in common. This facilitates varying and controlling the scene "resolution" at which the tile-lists are prepared and stored, and accordingly the memory requirements, etc., for the tile-lists.

Thus, according to a third aspect of the present invention, there is provided an apparatus for sorting primitives for rendering in a graphics processing system in which a scene to be rendered is divided into plural sub-regions for rendering, the apparatus comprising:

means for including a primitive to be rendered at least in a list of primitives for rendering for a single sub-region of the scene or in a list of primitives to be rendered to be used for more than one sub-region of the scene in common.

According to a fourth aspect of the present invention, there is provided a method of sorting primitives for rendering in a graphics processing system in which a scene to be rendered is divided into plural sub-regions for rendering, the method comprising:

selectively including a primitive to be rendered at least in a list of primitives for rendering for a single sub-region of the scene or in a list of primitives to be rendered to be used for more than one sub-region of the scene in common.

According to a fifth aspect of the present invention, there is provided an apparatus for sorting graphics primitives for rendering in a graphics processing system in which a scene to be rendered is divided into sub-regions for rendering, the apparatus comprising:

means for including a primitive to be rendered in one or more lists of primitives to be rendered, wherein the lists of primitives to be rendered can be exclusive to a single sub-region only or can be used for more than one sub-region of the scene.

According to a sixth aspect of the present invention, there is provided a method of sorting graphics primitives for rendering in a graphics processing system in which a scene to be rendered is divided into sub-regions for rendering, the method comprising:

including a primitive to be rendered in one or more lists of primitives to be rendered, wherein the lists of primitives to be rendered can be exclusive to a single sub-region only or can be used for more than one sub-region of the scene.

As will be appreciated by those skilled in the art, these aspects of the present invention can include any one or more or all of the preferred and optional features of the invention disclosed herein, as appropriate.

The sub-regions (tiles) that the scene to be rendered is divided into can be any suitable and desired such sub-regions. They are preferably all the same size and shape (i.e. regularly-sized and shaped tiles are preferably used), as is known in the art, although this is not essential. The sub-regions are preferably square or rectangular. The size and number of sub-regions can be selected as desired. In a preferred arrangement, each sub-region (tile) is 16×16 or 32×32 fragments in size (with the scene then being divided into however many such sub-regions as are required for the display (frame) size that is being used).

The set or sets of sub-regions comprising more than one sub-region for which a primitive list is prepared can be any desired and suitable group or groups of the scene sub-regions. Each set of more than one sub-region preferably comprises an integer number of sub-regions. However, this is not essential, and it would, e.g., be possible to prepare primitive lists for a set comprising portions of sub-regions, such as, for example, comprising one and a half sub-regions, or three and three-quarter sub-regions, etc. Such sets of sub-regions comprising fractions of sub-regions may be desirable for particular, e.g., unusual or irregular, primitive shapes, and/or sizes, as they may allow such primitives to be more efficiently listed in the tile-lists.

In a preferred embodiment, the set of plural sub-regions, and preferably each set of plural sub-regions, comprises a group of contiguous sub-regions. Most preferably the or each set of sub-regions forms a regularly shaped area of the screen, such as a square or rectangle. Most preferably the or each set of plural sub-regions forms a square. However, again this is not essential, and more irregular groupings (shapes) of plural sub-regions, such as, e.g., an "L"-shaped grouping or a triangular shaped grouping could be used, if desired. Again such irregular shapes may be useful for listing more unusual or irregularly, shaped and/or sized primitives.

In a preferred embodiment, the sub-regions included in a or more than one set of plural sub-regions can be selected and varied in use. This allows the system to, e.g., tailor the listing of primitives for plural sub-regions based on, e.g., the size and/or shape of the primitives to be rendered.

In a particularly preferred embodiment, primitive lists can be prepared for plural sets of plural sub-regions (i.e. such that there will be plural such primitive lists, each corresponding to a set of more than one sub-region of the scene). Each set of plural sub-regions could be different (e.g. in terms of their size and/or shape), but in a preferred such arrangement, each set of plural sub-regions has a corresponding and/or similar size and/or shape, and/or has a similar and/or corresponding number of sub-regions (and preferably arrangement of sub-regions) as the other sets of plural sub-regions. For example, some or all of the sets of plural sub-regions could be, and, indeed, preferably are, square in shape.

In these arrangements, each set of plural sub-regions preferably comprises a different set of scene sub-regions to the other sets of plural sub-regions. Each and every set of plural sub-regions could contain different sub-regions, or different sets of plural sub-regions could, e.g., have some, but not all, of their sub-regions in common.

In these arrangements, the sets of plural sub-regions preferably together cover the entire scene, i.e. encompass all the individual sub-regions that the scene is divided into. This arrangement effectively provides another layer or layers of regions that the scene is divided into (the sets of plural sub-regions), with each such region encompassing a plurality of the "base" sub-regions (tiles) that the scene is divided into. In this type of arrangement, primitive lists can accordingly be prepared at two (or more) different resolutions, either at a single sub-region level, or at a level of the sets of plural sub-regions.

In a particularly preferred arrangement, the entire scene area is divided into a group of plural sets of plural sub-regions such that the sets of plural sub-regions in the group together encompass all the individual sub-regions that the scene is divided into, with each set of plural sub-regions in the group preferably including the same number of sub-regions and, preferably, having the same shape. Such a group of sets of plural sub-regions effectively provides a layer of sets of sub-regions for which primitives can be listed overlying the base, single sub-regions "layer". Most preferably more than one such group of sets of plural sub-regions is provided, i.e. such that primitives can be listed in different layers (levels) if desired.

In a particularly preferred embodiment, primitive lists can be prepared for sets of plural sub-regions that contain different numbers of sub-regions. Thus, for example, a list could be prepared for a set of 4 sub-regions, or for a set of 16 sub-regions, and so on. This allows the resolution at which the primitive lists are prepared to be further varied and controlled. In a preferred embodiment, there are two or more, preferably three or more, different sized sets of plural sub-regions for which a primitive list can be prepared, most preferably having progressively decreasing levels of resolution (i.e. encompassing increasing numbers of sub-regions).

In a particularly preferred embodiment, the sets of plural sub-regions for which primitive lists can be prepared are arranged such that the scene is effectively overlaid by one or more layers of (groups of) sets of sub-regions and most preferably by plural layers of sets of sub-regions. Thus, for example, there could be a layer of sets of sub-regions which sets each encompass four sub-regions laid over the base "layer" of the single sub-regions. There could then, e.g., preferably also be a layer of sets of sub-regions each encompassing 16 sub-regions laid over the base single sub-region layer and the "four sub-regions" layer and so on.

In such an arrangement, the sets of sub-regions for a given layer preferably all encompass the same number of individual sub-regions, but the sets of sub-regions in each different layer (where provided) preferably comprise a different number of sub-regions to the sets in the other layers.

Thus, in a preferred embodiment, there are preferably one or more and preferably plural groups of sets of plural sub-regions (with each such group, e.g., and preferably, together forming a layer that covers the entire scene to be rendered (i.e. encompassing all the sub-regions that the scene is or can be divided into), with the sets of sub-regions in each group preferably all comprising the same number of sub-regions, and the sets of sub-regions in different groups comprising different numbers of sub-regions.

These arrangements can allow, for example, the scene to be rendered to be effectively covered by plural different resolution layers of sets of plural sub-regions, with each such "layer" being made up of a group (an arrangement) of sets of plural sub-regions each containing the same number of sub-regions, and the sets of plural sub-regions in different "layers" containing different numbers of sub-regions.

In a particularly preferred such arrangement, the groups (layers) of sets of sub-regions are arranged in a hierarchical fashion, i.e. such that the number of sub-regions in each set in each group progressively changes as one moves through the groups (layers). They are most preferably arranged such that they effectively form a square-based pyramid structure as one progresses up the layers. The number of sub-regions included in the sets of sub-regions for any given layer (group) preferably progressively increases as one moves up the layers from the base, single sub-region layer. Preferably, the sets of sub-regions are arranged such that the sets of sub-regions in each successive layer have 4 times as many sub-regions in them as the immediately preceding layer, i.e. such that the base layer is of single sub-regions, there is then a layer of sets containing four sub-regions, then a layer of sets of 16 sub-regions, and so on, preferably up to a single set of sub-regions that encompasses the entire scene to be rendered. Most preferably there are, in effect, three or more such layers (groups) (including the "base", single sub-region layer).

Such arrangements effectively allow primitive lists to be prepared for progressively decreasing levels of resolution (i.e. division into sub-areas) of the scene to be rendered.

In a particularly preferred such arrangement, a primitive list can be prepared for each sub-region (tile), for each 2×2 grouping of sub-regions, for each 4×4 grouping of sub-regions, for each 8×8 grouping of sub-regions, and so on, up to a primitive list for the entire scene to be rendered (i.e. a list for the entire frame buffer).

As will be appreciated by those skilled in the art, where the overall display area (scene) is, as will typically be the case, not square, then it can be the case that for the larger groupings of sub-regions in this manner, some of the sets of sub-regions will, in effect, extend beyond the edges of the scene (display). This does not matter, because the system will in any event not attempt to prepare or render primitive lists for sub-regions that are not within the scene to be rendered (i.e. that lie outside the scene or display), and so the fact that a given set of sub-regions may include sub-regions that lie outside the scene boundary does not and will not affect the primitive listing process.

In a preferred embodiment, the sets of sub-regions hierarchy is preferably arranged such that primitive lists can, in effect, be prepared for the entire scene, for the scene divided into four regions, for the scene divided into 16 regions, for the scene divided into 64 regions, and so on, down to its division into single sub-regions.

With the above arrangements, it can, for example, be ensured (by storing a given primitive at the appropriate level of resolution, i.e. for the appropriate sub-region grouping) that any given primitive will never need to be included in more than four primitive lists. This would allow, e.g., the memory requirement for the primitive (tile) lists to more reliably be capped (and the maximum possible memory requirement to be known (from knowing, e.g., the number of primitives that are to be rendered)).

While it is not essential that a primitive list is prepared for each and every sub-region or set of plural sub-regions that a given scene is or can be divided into, in a particularly preferred embodiment, a primitive list is prepared for each sub-region (tile) that the scene is divided into, and for each set of more than one sub-region that primitive lists can be prepared for. (However, it should be noted that in some cases in this arrangement the primitive lists may be and can be empty (i.e. contain no primitives), depending, e.g., on how the primitives are distributed in the scene, and in which (tile) lists it is decided to store the primitives in.)

Thus, according to a seventh aspect of the present invention, there is provided an apparatus for sorting graphics primitives for rendering in a graphics processing system, in which a scene to be rendered is divided into plural sub-regions for rendering, and one or more sets of sub-regions each comprising more than one sub-region of the scene are defined, the apparatus comprising:

means for preparing a list of primitives for rendering for each sub-region of the scene; and means for preparing a list of primitives for rendering for each set of more than one sub-region of the scene.

According to an eighth aspect of the present invention, there is provided a method of sorting graphics primitives for rendering in a graphics processing system, comprising:

dividing a scene to be rendered into a plurality of sub-regions for rendering;

defining one or more sets of sub-regions of the scene, each set comprising more than one sub-region of the scene; and preparing a list of primitives for rendering for each sub-region and for each set of more than one sub-region of the scene.

As will be appreciated by those skilled in the art, these aspects of the invention can include any one or more or all of the preferred and optional features of the invention disclosed herein. Thus, for example, preferably sets of plural sub-regions containing different numbers of sub-regions of the scene are prepared (and have primitive lists prepared for them).

The listing of a primitive and the primitives in the primitive lists for each sub-region and set of sub-regions, and the preparation of a primitive list for each sub-region or set of plural sub-regions, can be carried out in any appropriate and desired manner. For example, any technique already known and used for sorting and binning primitives into tile-lists, such as exact binning, or bounding box binning, or anything in between, can be used for this process.

Thus, for example, an initial determination of the sub-regions and sets of sub-regions that a primitive is to be rendered for could be made based on a determined location of the primitive in the scene (which location could, e.g., be the exact location of the primitive or an approximation of the primitive's location based on, e.g., a bounding box surrounding the primitive, as is known in the art), and the primitive then listed in some or all of the sub-regions or sets of plural sub-regions that its determined location indicates it should be rendered for. This would then be repeated for each primitive in the scene to allow a complete set of primitive lists for the scene to be prepared.

Thus, in a preferred embodiment, a location for a given primitive in the scene is determined and compared to the sub-regions and/or sets of plural sub-regions that the scene is divided into to determine which sub-regions and sets of plural sub-regions the primitive could or should be rendered for (e.g. appears (falls) within).

Such comparison and determination of the sub-regions, etc., that a primitive appears in can be carried out in any suitable manner, for example using existing techniques known in the prior art for such purposes. Thus, for example, "exact" binning techniques as discussed above could be used (in which case the actual sub-regions (tiles), etc., that the primitive appears in will be determined), or a bounding box technique could be used (in which case the sub-regions (tiles) that the bounding box covers will be determined, with the primitive listing accordingly potentially being less exact and including sub-regions that the primitive does not actually appear in, as is known in the art), or any arrangement in between "exact" binning and the most general bounding box techniques could be used, etc., as desired. This is then repeated for each primitive in the scene.

Where a bounding box technique is being used, then the bounding boxes can be generated where and as desired. For example, the bounding boxes could be generated on a per primitive basis, or for a set or sets of plural primitives, as is known in the art. The bounding boxes could, e.g., be generated by the graphics processor API or driver on the host system.

In a preferred embodiment, where bounding boxes are used, the bounding boxes are generated at the primitive listing stage, by the graphics processor or processing unit (preferably the processor that prepares the primitive lists), e.g. by means of a suitable software or hardware routine. This allows the bounding boxes to be generated locally on the graphics processor and then discarded once used for the primitive listing process. Such an arrangement could, e.g., take in the vertices for the primitive or primitives in question, and determine therefrom the maximum and minimum x, y positions for the primitive or primitives and then generate a bounding box accordingly, as is known in the art.

According to a ninth aspect of the present invention, there is provided an apparatus for sorting primitives for rendering in a graphics processing system in which a scene to be rendered is divided into plural sub-regions for rendering, the apparatus comprising:

means for determining a sub-region or sub-regions that a primitive to be rendered could or should be rendered for;

means for including the primitive in a list of primitives to be rendered for a sub-region that it is determined that the primitive could or should be rendered for; and means for including the primitive in a list of primitives to be rendered for a set of sub-regions comprising more than one sub-region that includes a sub-region that it is determined that the primitive could or should be rendered for.

According to a tenth aspect of the present invention, there is provided a method of sorting primitives for rendering in a graphics processing system in which a scene to be rendered is divided into plural sub-regions for rendering, the method comprising:

determining a sub-region or sub-regions that a primitive to be rendered could or should be rendered for; and including the primitive in a list of primitives to be rendered for a sub-region that it is determined that the primitive could or should be rendered for; or including the primitive in a list of primitives to be rendered for a set of sub-regions comprising more than one sub-region that includes a sub-region that it is determined that the primitive could or should be rendered for.

These aspects of the invention can again include any one or more or all of the preferred and optional features of the invention described herein, as appropriate. Thus, for example, the sub-regions that a primitive could or should be rendered for could be determined using an exact binning technique (in which case the sub-regions that the primitive could or should be rendered for will comprise exactly those sub-regions that the primitive will appear in (falls within)), or could be determined using a bounding box technique (in which case the sub-regions that it is determined that the primitive could or should be rendered for should comprise the sub-regions that the primitive will appear in (falls within) but may also include other sub-regions where the primitive does not in fact appear (but which are encompassed by the bounding box), as is known in the art), or could be determined using any other suitable and desired technique.

A given primitive could, e.g., be included in the primitive list for each and every sub-region and set of plural sub-regions that it is determined it should be rendered for (e.g., in the case of exact binning, it is found to appear in). However, in a particularly preferred embodiment, a given primitive is only included in the primitive lists of selected (a selected number of the) sub-regions and sets of plural sub-regions that it is determined the primitive could or should be rendered for, i.e. the primitive is selectively included in the primitive lists of the sub-regions and sets of plural sub-regions that it is determined that the primitive should be rendered for (e.g. that the primitive has been found to fall within).

Thus, for example, a primitive may be included in the primitive list for a sub-region (or the individual primitive lists for plural individual sub-regions) that the primitive is to be rendered for (e.g. has been found to fall within), and in a primitive list for a set of plural sub-regions that the primitive is to be rendered for (e.g. has been found to fall within).

Such selective inclusion of primitives within the primitive lists facilitates greater flexibility in terms, e.g., of the memory usage and requirements for storing the primitive lists.

Thus, according to an eleventh aspect of the present invention, there is provided an apparatus for sorting primitives for rendering in a graphics processing system in which a scene to be rendered is divided into plural sub-regions for rendering, the apparatus comprising:

means for selectively including primitives for rendering in a list of primitives corresponding to a single sub-region of the scene to be rendered, and/or in a list of primitives corresponding to more than one sub-region of the scene to be rendered.

According to a twelfth aspect of the present invention, there is provided a method of sorting primitives for rendering in a graphics processing system in which a scene to be rendered is divided into plural sub-regions for rendering, the method comprising:

selectively including primitives for rendering in a list of primitives corresponding to a single sub-region of the scene to be rendered, and/or in a list of primitives corresponding to more than one sub-region of the scene to be rendered.

Again, these aspects of the present invention can include any one or more or all of the preferred and optional features of the invention disclosed herein, as appropriate. Thus, for example, there are preferably plural lists of primitives each corresponding to different sub-regions or sets of sub-regions of the scene in which a primitive can selectively be listed.

In these aspects and embodiments of the invention, the arrangement is preferably such that a primitive is not included in the primitive lists for all the sub-regions and sets of plural sub-regions that it is initially determined that the primitive could or should be rendered for (e.g. that the primitive or its bounding box is found to fall within or intersect or touch), but is included in the primitive lists of less than all the sub-regions and sets of sub-regions that it is initially determined that the primitive could or should be rendered for.

In other words, the arrangement is preferably such that a primitive can be and preferably is only listed in some but not all of the separate primitive lists in which it could or should be listed (i.e. the primitive lists for all the sub-regions and sets of plural sub-regions that it is initially determined that the primitive could or should be rendered for (e.g. that the primitive or its bounding box is found to fall within or intersect or touch)). Thus, a primitive is preferably listed in at least one, but not all, of the separate primitive lists for all the sub-regions and sets of sub-regions that it is determined that the primitive could or should be rendered for.

The primitives can be selectively stored in the primitive lists of the sub-regions and sets of sub-regions that it is determined that they could or should be rendered for (e.g. that they or their bounding box are found fall within) in any suitable and desired manner. For example, preferentially listing the primitives for sets of plural sub-regions, rather than on a sub-region by sub-region basis, will reduce the memory requirements for storing the primitive (tile) lists (since fewer primitive lists will be needed for the scene), and vice-versa. Thus, for example, selectively listing primitives at the sub-region or at the sets of sub-regions level (or levels) can be used to vary and control the memory usage requirements for the tile listing process. The present invention accordingly facilitates a more flexible and controllable (at least as regards memory usage requirements) tile listing process.

It is preferred for a given primitive only to be included in sufficient primitive lists such that it can be rendered for all the scene areas where it is determined that it should be rendered for (e.g. where the primitive or its bounding box is present). This helps to avoid unnecessary duplicated listing of primitives for the same scene area. Thus, in a particularly preferred embodiment, a primitive is listed in one primitive list only, in respect of each sub-region for which it is to be rendered. This list could be the primitive list for the individual sub-region or a primitive list for a set of plural sub-regions that includes the sub-region in question.

Thus, when a primitive is included in a primitive list for a set of plural sub-regions, it is preferred that the primitive is not also included in the individual primitive lists of any of the sub-regions that are in the set of plural sub-regions.

Similarly, where there are plural sets of plural sub-regions all covering the same scene area, it is again preferred that a primitive is not included in the primitive lists for any sets of plural sub-regions that are entirely encompassed by a set of plural sub-regions in whose primitive list the primitive is included.

Thus, most preferably, a primitive is not included in the primitive lists of any sub-regions or sets of plural sub-regions that are entirely encompassed (covered) by a larger set of plural sub-regions in whose primitive list the primitive is included.

It should be noted here that a given primitive may be listable in, and, indeed, may be included in, primitive lists at different levels of resolution (i.e. scene area (different sized sets of sub-regions)) for different regions of the scene. For example, a primitive may be included in a primitive list for a single scene sub-region (tile) in part of the scene where it lies, but included in a primitive list for a set of plural sub-regions (i.e. at a higher level) for another part of the scene where it appears. However, in a preferred embodiment, a given primitive is listed at one level of resolution only, i.e. the primitive is listed for the same level (size) sets of sub-regions (or for single sub-regions only) for all the scene regions where it is to be listed (rendered).

Where sets of plural sub-regions are arranged such that the scene is effectively overlaid by plural layers of different resolution (size) scene areas, as discussed above, then in a particularly preferred embodiment, the primitives are allocated to primitive lists for the sub-regions or sets of sub-regions by testing a primitive, and preferably each primitive, at each successive level (layer) of sets of sub-regions, starting with the highest level (i.e. the level where the set or sets of sub-regions include the most sub-regions), to determine how many different primitive lists the primitive would need to be included in at the level in question. This process is preferably continued iteratively down through the layers until it is determined that the number of primitive lists the primitive should be listed in at a given level (layer) exceeds a, preferably predetermined, threshold number of lists, or the bottom, single sub-region level layer is reached.

Most preferably, once a layer is reached where the primitive would need to be included in more primitive lists than the threshold number if it were to be listed at that level, then the primitive is in fact "listed", i.e. placed in primitive lists for sets of sub-regions, at the preceding level (layer) (i.e. the final layer where the number of primitive lists it would need to be included in does not exceed the threshold number). This ensures that a primitive or each primitive should never be included in more primitive lists than the threshold number of primitive lists, thereby facilitating, e.g., more precise control and knowledge of the memory usage requirement for the primitive (tile) lists.

Thus, in a particularly preferred embodiment, a primitive, and preferably each primitive, is not listed in more than a selected, preferably predetermined, (threshold) number of primitive lists.

The threshold number of primitive lists to be used in these arrangements can be selected as desired. Since, as discussed above, the threshold number will, in effect, act as the maximum number of primitive lists that a primitive will be listed in, it can be used to, in effect, set the desired optimisation or compromise (trade-off) in the system between having to store more and longer primitive lists but with a consequent reduction in the amount of unnecessary processing of primitives at the rendering stage (by setting a higher threshold number) and vice-versa.

The threshold number is preferably an integer greater than one, preferably greater than two and most preferably greater than three. In a particularly preferred embodiment, the threshold number of primitive lists is four. The threshold number can preferably be varied and set in use.

In a particularly preferred embodiment, the threshold number corresponds to the ratio of the numbers of sub-regions in the sets of sub-regions in immediately successive layers in the sets of sub-regions hierarchy (i.e. the multiplying factor for the numbers of sets of sub-regions in each successive layer). Thus, for example, where the sets of sub-regions are arranged such that they are in successive layers of 1×1, 2×2, 4×4, 8×8, etc., sub-regions laid over the scene, i.e., such that the number of sub-regions in each layer increases fourfold each time, the threshold number is preferably four.

In a particularly preferred arrangement, where it is found that at the level (layer) one step up from the level (layer) where the primitive would need to be listed in more than the threshold number of primitive lists, the number of primitive lists that a primitive will be listed in is equal to the threshold number (e.g. 4), it is then tested whether at the next immediately preceding level, the primitive would need to be included in only a single primitive list, and if it would, the primitive is listed in the single list at the higher level, rather than at the level where it needs to be listed in the threshold number of primitive lists.

In other words, where a primitive could be listed at one level in a single primitive list (i.e. for a single set of sub-regions only), but at the next level down would have to be listed in the threshold number of primitive lists (i.e. for the threshold number of sets of sub-regions or sub-regions (at the lowest, single sub-region level)), (and the next level down is more than the threshold number of primitive lists), then it is preferred to list the primitive at the single list level, i.e. to include it in a single list only. In other words, if the number of primitive lists that a primitive would have to be listed in changes from one to the threshold number of primitive lists (e.g. 4) on stepping down successive levels, the primitive is preferably listed at the single list level. This is advantageous, because it allows the primitive to only be included in one list whilst still ensuring that the primitive is processed for all the sub-regions that it needs to be rendered for.

Thus, as can be seen from the above, in a particularly preferred embodiment, a given primitive is tested at each level in the sets of sub-regions hierarchy, starting with the second from top level (since the top level will be a single list covering the entire scene), and then the third from top level, and so on, until it is found that the primitive needs to be included more than the threshold number of primitive lists at a given level. The primitive will then be listed at the immediately preceding level, i.e. at the list level where it requires the threshold number or less of primitive lists to list the primitive, except in the special case where at the next level up (i.e. the level two levels above the level where the threshold number of primitive lists is exceeded), it can be listed in a single primitive list, in which case the primitive will be listed in that single list.

This will then be repeated for each primitive in the scene, until all the primitives for the scene have been listed and primitive lists for all the sub-regions and sets of sub-regions that the scene is or can be divided into have been prepared.

It would, of course, be possible to use other arrangements for deciding where (at what level in the sets of sub-regions' hierarchy) to list a given primitive or primitives. For example, rather than, or as well as, considering the absolute number of primitive lists that will be needed to list a primitive at a given level, the difference in the number of primitive lists that a primitive would need to be included in at, e.g., two, successive layers (levels) could be considered and used to determine where to (at what level to) list a given primitive. For example, the difference could be compared to a threshold value and the primitive listed on the basis of the result of that comparison. Other arrangements would, of course, be possible.

The individual primitive lists and the primitives in them can be arranged in any desired and suitable fashion and include any desired and suitable data. The lists are preferably arranged and contain data in the manner that is already used for such lists in the art. Thus they preferably include, for example, an identifier for, and indices or pointers to the vertices for, each primitive in the list. The primitives are preferably listed (ordered) in each list in the desired rendering order (first to last), as this allows the primitives to be read from the lists on a first-in, first-out basis. As is known in the art, the primitives will usually be generated in the order in which they are to be rendered. In such a case the primitives can simply be, and preferably are, listed in each list in the order that they are generated.

Once all the primitives have been sorted and primitive lists have been prepared for the sub-regions and sets of sub-regions as discussed above, the sub-regions (tiles) can then be processed and rendered, using the primitive lists to determine which primitives need to be processed for each sub-region.

This rendering process may be and preferably is carried out in a similar manner to known tile-based rendering systems. Thus, preferably, each sub-region (tile) is processed and rendered separately, i.e. the separate, individual sub-regions are rendered one-by-one. This rendering can be carried out in any desired manner, for example, by rendering the individual sub-regions in succession or in a parallel fashion. Once all the sub-regions (tiles) have been rendered, they can then be recombined, e.g., in a frame buffer, for display, as is known in the art.

As will be appreciated by those skilled in the art, as each sub-region is processed and rendered, in order to determine the primitives that must be processed and rendered for the sub-region it will be necessary to check both the primitive list that is exclusive to that sub-region, and the primitive lists of all the sets of plural sub-regions that include the sub-region.

The Applicants have recognised that this may mean that a primitive listed in a primitive list for a set of plural sub-regions will be processed for each sub-region of the set of plural sub-regions, irrespective of whether or not it actually appears within a given individual sub-region of the set, and that a consequence of this is that primitives may be processed for sub-regions that they do not actually appear in. However, notwithstanding this, the Applicants believe that the present invention is still advantageous, as it allows, e.g., system designers and application programmers to better and more readily control any desired optimisation and trade-offs between, e.g., memory usage requirements and graphics processing requirements than, e.g., prior art systems.

This primitive list checking and the identifying of primitives to be rendered for a given sub-region carried out as desired. However, in a preferred embodiment, the primitive lists are provided to a primitive selection unit that selects the next primitive to be rendered from the primitive lists and then provides that primitive to a rendering unit (e.g. pipeline) for rendering.

The primitive selection unit can take any appropriate form. In a preferred embodiment it comprises a tile read unit.

Most preferably, the different primitive lists, e.g. different level (resolution) lists that cover a given sub-region (tile) are provided to the primitive selection unit in parallel (i.e. simultaneously), with the primitive selection unit then selecting the next primitive to process from one of the lists. In other words, the primitive selection unit will receive and support multiple primitive (tile) lists, and select primitives for rendering from those multiple lists.

It is believed that such arrangements may be new and advantageous in their own right. Thus, according to a thirteenth aspect of the present invention, there is provided an apparatus for selecting a primitive for rendering in a graphics processing system, the apparatus comprising:

a primitive selection unit for selecting primitives for rendering; and means for providing to the primitive selection unit plural lists of primitives in parallel; wherein the primitive selection unit comprises means for selecting a primitive to be rendered from one of lists of primitives provided to it.

According to a fourteenth aspect of the present invention, there is provided a method of selecting a primitive for rendering in a graphics processing system, the method comprising:

providing to a primitive selection unit plural lists of primitives in parallel; and the primitive selection unit selecting a primitive to be rendered from one of lists of primitives provided to it.

These aspects and embodiments of the invention can, and preferably do, as will be appreciated by those skilled in the art, include any one or more or all of the preferred and optional features of the invention described herein. Thus, for example, the graphics processing system is preferably a tile-based rendering system (in which case, the primitive selection unit will, e.g., (and preferably does) comprise a tile read unit).

The next primitive for rendering could be selected from all the primitive lists in parallel (e.g. the primitive selection unit could simply be provided with all the primitive lists in parallel for it to choose the next primitive for rendering from). However, in a preferred embodiment, the next primitive for rendering is selected from (i.e. the primitive list selection unit, where used, is provided with) only a selected set of (typically and preferably less than all of) the primitive lists. Most preferably, the primitive is chosen from (the primitive selection unit is provided with) all the primitive lists that are known to include or cover the sub-region in question (i.e. the sub-region that is currently being rendered), and most preferably it is chosen from (the primitive selection unit is provided with) only those primitive lists. In a particularly preferred embodiment, the primitive is chosen from (the primitive list selection unit is simultaneously provided with) a single primitive list for each level of resolution, i.e., where appropriate, a list for the single sub-region in question, a list for the 2×2 set of sub-regions that includes the sub-region in question, a list for the 4×4 set of sub-regions that includes the sub-region in question, a list for the 8×8 set of sub-regions that includes the sub-region in question, and so on.

The set of primitive lists that primitives are to be selected from for a given tile (i.e. the set of primitive lists that the primitive selection unit should read to identify primitives for rendering for a given tile) can be indicated (e.g. to the primitive selection unit) in any desired fashion, for example by sending this data as appropriate to the graphics processor (e.g. primitive selection unit). In a preferred embodiment, this information is sent when a new tile is to be rendered, e.g. as part of or associated with a "new tile" command (the command that tells the rendering unit to start rendering a new tile). Thus, each sub-region (tile) preferably has associated with it in some way, the set of primitive lists to be used for the sub-region (tile). Other arrangements would, of course, be possible.

The information indicating which primitive lists are to be used for a given sub-region (tile) can be provided in any suitable and desired form. In a preferred embodiment, a set of pointers or indices to the relevant primitive lists is provided. In another preferred arrangement, changes to the set of pointers or indices to the primitive lists are provided, to allow the system to identify and change the primitive lists that need to be changed when a new sub-region (tile) is to be rendered. It would also be possible to, e.g., prepare a predetermined set of relationships between the primitive lists to use and the x-y positions of the sub-regions (tiles), which relationships could then be used to determine the primitive lists to use for a sub-region (tile) on the basis of the sub-region's (tile's) x, y coordinates. For example, the x, y position of a sub-region could be used to index into a look-up table specifying the primitive lists to be used for each sub-region position. Other arrangements would, of course, be possible.

The next primitive to be rendered can be chosen (e.g. by the primitive selection unit) from the primitive lists that are provided (to be used for a sub-region) in any desired and suitable manner. For example, a primitive from the lowest resolution list (e.g. a single sub-region list) could always preferentially be selected until the list is exhausted and so on, or vice-versa.

However, the Applicants have recognised that it can be important in graphics processing to ensure that primitives are rendered in a desired order (typically the order in which they are first generated). This is not a difficulty where there is only a single primitive list for a given sub-region (tile), since the primitives may be and will be added to and listed in the primitive list in the correct order, i.e. one after another, on a first-in, first-out basis, as they are generated.

Indeed, as discussed above, the primitives are preferably listed in order of their generation in the individual tile lists generated in accordance with the present invention, and so for any given primitive list, the primitives will where this arrangement is followed, be listed in the correct order in the individual primitive lists in any event.

However, it would still be desirable to be able to ensure that where, e.g., the primitive selection unit is provided with plural primitive lists from which to select the next primitive for rendering simultaneously, the selection unit can select the primitives from the different lists in the correct, desired order.

Thus, in a particularly preferred embodiment, the primitive generating and sorting process is able to index or add an index to the primitives, preferably as they are included in the primitive lists, which index can then be used, e.g., by the primitive selection unit, to select the primitive to be processed next. This is preferably done by numbering the primitives consecutively, preferably as they are included in the primitive lists. Most preferably each primitive has associated with it a sorting index which index is preferably allocated as the primitive is included in the primitive lists (i.e. at the primitive listing (binning) stage). The number (sorting index) allocated to a primitive or each primitive is preferably included in the primitive lists with the primitive identifier, etc., preferably as the primitive is added to (listed in) the primitive list or lists that it is determined to the primitive will be listed for.

The indexing can be done in any appropriate and desired manner. For example, a counter could be incremented each time a new primitive is processed for listing in the primitive lists (i.e. each time a new primitive is "binned") and the current count allocated to the primitive. Other indexing arrangements, such as using segmented indices, indexing the primitives by groups or sets and then within each group or set, etc., would also, of course, be possible.

Such indexing of the primitives as they are listed (binned) assists with the rendering process for a sub-region (tile), as it will, e.g., facilitate rendering the primitives in the correct order. In particular, the (sorting) index given to each primitive can be used to select the next correct (desired) primitive for rendering, thereby allowing, e.g., the desired primitive order to be reconstructed when the primitives are to be rendered and helping to ensure that the primitives can be and are taken from the different primitive lists for rendering in the desired (correct) order.

In this arrangement, the next primitive to process is preferably selected, e.g. by the primitive selection unit, from the multiple primitive lists on the basis of the indexes of the (next) primitives in each of the lists (e.g., and preferably, of the next primitive in, e.g. the primitive effectively at the head of, each list). Where, e.g., the primitives are indexed in ascending order (such that the lowest numbered primitive is to be processed first), the primitive selection unit, for example, preferably determines (reads) the index of the next primitive in each list and selects the lowest indexed primitive for rendering next.

It is believed that such indexing arrangements for primitives may be new and advantageous in their own right. Thus, according to a fifteenth aspect of the present invention, there is provided a graphics processing system, comprising:

means for listing graphic primitives for rendering;
means for associating with each listed graphics primitive an index for the primitive; and
means for using the indices associated with the graphics primitives to sort the primitives.

According to a sixteenth aspect of the present invention, there is provided a method of operating a graphics processing system, comprising:

listing graphic primitives for rendering;
associating with each listed graphics primitive an index for the primitive; and
using the indices associated with the graphics primitives to sort the primitives.

As will be appreciated by those skilled in the art, these aspects of the invention may and preferably do include any one or more of all the preferred and optional features of the invention described herein, as appropriate. Thus, for example, the indices allocated to the primitives are preferably used to order (sort) the primitives for rendering (i.e. to control the order in which the primitives are rendered), and are preferably allocated to the primitives as they are listed (binned) in primitive lists for rendering. Similarly, the primitives can preferably be listed in primitive lists that are exclusive to single sub-regions of the scene to be rendered, and in primitive lists that are to be used for plural sub-regions of the scene in common, as discussed above.

The Applicants have further recognised that indexing primitives in the manner discussed above such that the correct order of the primitives can be recreated when the primitives are to be rendered can be used to facilitate other advantageous processes and operations for graphics processing.

For example, and in particular, indexing the primitives in this manner can facilitate processing the individual primitives in a distributed fashion, for example by plural different processors or processing units, since the indices can be used to regather (recombine) the distributed primitives into the correct order when the primitives are to be rendered. This would allow, for example, different primitives from a stream of primitives to be rendered to be distributed between plural different geometry processors or processing units operating in parallel, with the primitives then being recombined into their original "stream" for rendering.

Thus, a primitive indexing arrangement of the type described above could be used, for example, to support and facilitate multiple geometry and/or binning (primitive listing) engines operating in parallel on a given stream (set) of primitives, with the commensurate increase in processing speed, etc., that that could confer.

It is believed that such arrangements may be new and advantageous in their own right. Thus, according to a seventeenth aspect of the present invention, there is provided a method of processing a group of graphics primitives for rendering, comprising:

distributing primitives from the group of primitives across multiple processing units; and
recombining the distributed primitives into a group of primitives.

According to an eighteenth aspect of the present invention, there is provided an apparatus for processing a group of graphics primitives for rendering, the apparatus comprising:

means for distributing primitives from the group of primitives across multiple processing units; and
means for recombining the distributed primitives into a group of primitives.

As will be appreciated by those skilled in the art, these aspects and arrangements of the invention can and preferably do include any one or more or all of the preferred and optional features of the invention described herein, as appropriate.

Thus, for example, the group or set of primitives preferably comprises a stream of primitives, such as a linear series of primitives in a particular order. Similarly the group of primitives is preferably recombined into a single group of primitives (e.g., and preferably, into a single stream of primitives). It would also be possible, e.g., as is known in the art, for the group of primitives to not necessarily be provided as a "stream" at a higher level of input to the system, but, e.g., to be configured as a stream for some or all of the underlying processes of the system (and distributed in the manner of these aspects and embodiments of the invention when not in the form of a stream and/or when in the form of a stream).

Thus, in a particularly preferred embodiment, the group of primitives is a stream of primitives, primitives from the stream are distributed across the multiple processing units, and the distributed primitives are recombined into a single stream of primitives.

Similarly, the primitives preferably each have an index associated with or allocated to them before they are distributed to the processing units, which indices are preferably used when recombining the distributed primitives, e.g. into the single stream. The indices are preferably used to order or sort the primitives (e.g. to place them in the desired order in the recombined stream).

Equally, the processing units that the primitives are distributed to are preferably similar units (e.g. in terms of the functions and/or operations that they can perform), and preferably each carry out the similar operations (functions) on the distributed primitives (although this is, of course, not essential and different processing units and operations could be used if desired or where appropriate). (It will be appreciated here that by the "same operations" it is intended that the processing units carry out the same form or type of operation or process on the primitives, although, in practice, the actual operations that are performed will vary and depend, e.g., on the nature of and requirements of each individual primitive.) The processing units preferably operate in parallel, e.g. such that they can each be operating on (processing) a (different) primitive simultaneously.

In a preferred embodiment, the processing units are geometry processors, and/or most preferably carry out one or more geometry processing operations, such as transforming, clipping and/or lighting the primitives, and/or carry out a primitive binning process (i.e. place the primitives in primitive lists to be used to identify which primitives to render for a given sub-region or sub-regions of a scene to be rendered).

Similarly, the method and apparatus of these aspects and embodiments of the invention preferably includes a step of or means for rendering the primitives. Most preferably in such an arrangement, the recombining of the distributed primitives into a common stream occurs prior to the primitives being sent for rendering or as (at the same time as) the primitives are sent for rendering.

According to a nineteenth aspect of the present invention, there is provided a method of processing a group of graphics primitives for display, comprising:

allocating an index to primitives in the group of primitives;

distributing primitives from the group of primitives across multiple processing units; and using the indices allocated to the primitives to sort the primitives after they have been processed by the processing units.

According to a twentieth aspect of the present invention, there is provided an apparatus for processing a group of graphics primitives for display, the apparatus comprising:

means for allocating an index to primitives in the group of primitives;

means for distributing primitives from the group of primitives across multiple processing units; and means for using the indices allocated to the primitives to sort the primitives after they have been processed by the processing units.

As will be appreciated by those skilled in the art, these aspects and arrangements of the invention can and preferably do include any one or more or all of the preferred and optional features of the invention described herein, as appropriate.

Thus, for example, the group of primitives preferably comprises a set of primitives, and most preferably a stream of primitives.

Similarly, the primitives preferably each have an index associated with or allocated to them before they are distributed to the processing units, and the indices are preferably used to order the primitives after processing by the multiple processing units for subsequent processing of the primitives, and most preferably to (where appropriate) recombine the distributed primitives into a single stream of primitives (having a desired primitive order).

Equally, the processing units that the primitives are distributed to preferably each carry out the same (similar) operations (functions), preferably operate in parallel, and most preferably carry out one or more geometry processing operations, and/or carry out a primitive binning process.

Similarly, the method and apparatus of these aspects and embodiments of the invention preferably include a step of or means for rendering the primitives, and the indices allocated to the primitives are preferably used to order the primitives for rendering.

Thus, according to a twenty-first aspect of the present invention, there is provided a method of processing a group of graphics primitives for display, comprising:

allocating an index to primitives in the group of primitives;

distributing primitives from the group of primitives across multiple processing units;

rendering primitives from the group of primitives; and using the indices allocated to the primitives to control the order in which the primitives are rendered.

According to a twenty-second aspect of the present invention, there is provided an apparatus for processing a group of graphics primitives for display, the apparatus comprising:

means for allocating an index to primitives in the group of primitives;

means for distributing primitives from the group of primitives across multiple processing units;

means for rendering primitives from the group of primitives; and means for using the indices allocated to the primitives to control the order in which the primitives are rendered.

As will be appreciated by those skilled in the art, these aspects and arrangements of the invention can and preferably do include any one or more or all of the preferred and optional features of the invention described herein, as appropriate. Thus, for example, the primitives are preferably in the form of a stream of primitives for rendering, the primitives preferably each have an index associated with or allocated to them before they are distributed to the processing units, and the processing units that the primitives are distributed to preferably each carry out the same (similar) operations (functions), preferably operate in parallel, and most preferably carry out one or more geometry processing operations, and/or carry out a primitive binning process.

Where a distributed primitive processing arrangement is used, then the primitives in the primitive group (e.g. stream) can be distributed to the individual processing units in any desired manner. For example, the primitives could simply be distributed one-by-one to the available processing units. In a preferred embodiment, a selected set or batch of primitives from the group (e.g. stream) is sent to one processing unit, with the next set or batch in the group being sent to the next processing unit, and so on. The arrangement is preferably such that any given primitive in the group of primitives is sent to one processing unit only, although this is not essential.

In a particularly preferred embodiment, the primitives in the group (e.g. stream) of primitives are distributed to the multiple, e.g. parallel, processing units on a drawing call basis, preferably such that all the primitives for a given drawing call are sent to the same processing unit (but different drawing calls may be sent to, and preferably are sent to, where possible, different processing units). As is known in the art, in graphics processing primitives are commonly grouped together in sets, e.g., for a particular scene region, which the programmer intends to be rendered in one go, together as a group. Such groups of primitives that are to be processed together are commonly referred to as "drawing calls". Thus, distributing primitives for processing on a drawing call basis advantageously, for example, ensures that the primitives for a drawing call remain "together" when they are processed.

The primitives can be indexed (where this is used) in these arrangements in any suitable manner (i.e., so long as the indexing permits the desired primitive order (e.g. stream) to be recreated (e.g. when rendering the primitives)). Thus, for example, all the primitives could simply be numbered consecutively, e.g., as they are distributed, e.g. in a similar manner to that discussed above.

However, in a preferred arrangement, particularly where the primitives are distributed on a batch-by-batch (set-by-set) basis (e.g. on a drawing call basis), a combined or segmented indexing (numbering) scheme is used. Most preferably, the batches (e.g. drawing calls) are numbered, preferably consecutively, and then the primitives for (within) each batch are numbered (again, preferably consecutively). Thus, for example, for drawing call number 1, there may then be primitives 1 to n, and then under drawing call number 2, there would then be primitives 1 to m, and so on. In other words, the drawing calls would, for example, be indexed, and then the primitives within each drawing call indexed. When the primitives are to be recombined, the system would then, e.g., take the drawing calls (batches) in order, one after another, and take, for a given drawing call, the primitives in order within each drawing call (batch).

In a preferred such embodiment, the indexing is arranged such that the higher order bits (a selected set of the highest order bits) of the index are used for the batch, e.g., drawing call number, and then the (remaining) lower order bits are used for the primitive number within the batch (e.g. drawing call). This provides a particularly convenient way of indexing the primitives on a per batch (e.g. drawing call) basis, and accordingly for distributing primitives in batches to plural processors operating in parallel. In other words, segmented index numbers are preferably used, with the higher order bits representing the batch (e.g. drawing call) number, and the lower order bits representing the primitive number within the batch (e.g. drawing call).

As will be appreciated by those skilled in the art, in the above arrangements, it may be the case that within a given batch, not all of the available primitive indices will be needed and thus used. In this case, when it comes to using the indices to order the primitives, e.g., for rendering, the system would, once all the primitives for a given batch have been processed (e.g. rendered), then step to the next batch (drawing call) and start to, e.g., render primitives from there. To facilitate this, where desired, an indicator, such as a jump or link command, could be included in the index to allow the system to recognise when the primitives for a given batch (e.g. drawing call) have been exhausted, such that the system knows to then move on to the next batch (drawing call) in the index order.

Thus, it can be seen that in a preferred embodiment of these arrangements and aspects of the invention, the stream or set of primitives that is to be rendered (e.g. for a scene) will be divided up into separate batches (with each batch of primitives preferably corresponding to a drawing call), with the batches of primitives being distributed to plural geometry and binning engines that are operating in parallel, which engines will carry out geometry operations such as transformations on the primitives that they receive and list the primitives in primitive lists for sub-regions or sets of sub-regions of the screen. Thereafter, when it comes to rendering the primitives, the rendering process can, as discussed above, use the indices associated with the primitives stored in the primitive lists to recreate the desired and correct order for rendering the primitives.

In this way, these arrangements of the present invention can be used, for example, to allow geometry and primitive binning operations to be carried out in a distributed, parallel fashion, which could, for example, be used to enhance the efficiency of the process.

Where, as in the above arrangements, indices are to be allocated to primitives, this can be done in any suitable and desired manner. It is preferably done before the primitives are distributed to the processing units, and most preferably at the time of their distribution. It would be possible, e.g., to allocate a complete index to each primitive in one go (e.g. at distribution time), or, e.g., the index could be allocated in a number of stages. For example, where the primitives are distributed on a drawing call basis as discussed above, then the "drawing call" index could be allocated when the drawing call is distributed for processing, but the indexing of individual primitives within a drawing call could be carried out later (or not at all), e.g., as the drawing call is processed.

As will be appreciated by those skilled in the art, it would be possible in the above arrangements simply to allow sufficient indices (e.g. numbers) such that it should be possible to index each and every primitive that could ever be generated for any given scene. However, the Applicants have recognised that this may not always be desirable. For example, it may be inefficient to allow for the possibility of indexing to a particularly large number of primitives for a scene that in practice may rarely or never be reached. On the other hand, if the indexing is not arranged so as to be able to cope with the maximum number of primitives that any scene could require, there would be a possibility that the number of primitives for a scene could exceed the capacity of the indexing that can be allocated to the primitives.

It would, e.g. be possible in such circumstances to return to the beginning of the indexing (i.e. to "wrap around" the primitive numbering). However, the Applicants have recognised that this may not always be desirable or appropriate, since it could result in two different primitives that are still "live" (i.e. that are still being or to be rendered) both having the same index.

Thus, in a particularly preferred embodiment, the system can recognise when the primitive indexing capacity has been reached or exhausted and in response thereto list the primitives such that from then on, there is only a single primitive list to select primitives from for a given sub-region, e.g. such that the primitive selection unit will only read for primitives after the index is exhausted a single primitive list for a given sub-region. This will ensure that, e.g., the primitive selection unit only has a single primitive list from which to select primitives from for rendering for any given sub-region once the indexing capacity has been exhausted, and thereby ensure that once the system's capacity for indexing the primitives consecutively has been exhausted, the system can still process the primitives (since from then on there will be only a single primitive list from which to select primitives for rendering for any given sub-region and thus there will no longer be a need to choose between primitives in two or more lists).

This arrangement thus provides a fail-safe mode of operation in the event that the available indices for primitives run out.

The above arrangement can be achieved in any desired and suitable manner. In a preferred embodiment, it is achieved by the system listing all primitives generated after the indexing capacity has been exhausted at the same, selected, preferably predetermined, level (layer) of resolution, e.g. always in the single sub-region lists, or always in the 2×2 sub-region lists, or always in the 4×4 sub-region lists, etc.

Thus, in a particularly preferred embodiment, the system is able to recognise that the index has reached the highest available index (e.g. the counter has reached its maximum value), and in response thereto will from then on always list the primitives at the same given, selected, preferably predetermined, level of resolution (layer).

In these arrangements it is preferred for the highest index number available to be reserved and allocated to all the primitives generated after the penultimate index primitive has been generated, so as to allow the system readily to identify when the "index-exhausted" state has been reached and is in operation.

In a preferred embodiment, the system (e.g. primitive selection unit) can identify if it has already passed for rendering a primitive that it is currently selecting from for rendering, and can ignore the primitive and look to select a different primitive in that event. This situation could arise, e.g., if the same primitive appears in two different primitive lists that cover a given sub-region (tile), and the primitive has already been rendered from one of the lists when it, e.g., arrives at the head of the other list or lists that it is included in. Recognising this event allows the system to avoid rendering the same primitive twice.

Thus, in a preferred embodiment it can be recognised (e.g. the primitive selection unit can recognise) when the primitive lists primitives are to be selected from for rendering include the same primitive more than once (e.g. the same primitive is at the head of two or more of the primitive lists provided to the primitive selection unit simultaneously), so that, e.g. and preferably, avoid sending the same primitive for rendering twice can be avoided.

The recognition of the repetition of a primitive in this manner can be carried out in any suitable and desired manner. For example, the primitive selection unit or another unit could use the primitive indexes of the primitives (e.g. compare them) to see if they are repeated (e.g. match). If a duplicated or repeated primitive is recognised, then the system (e.g. primitive selection unit) preferably selects one for rendering and discards the other.

In a particularly preferred embodiment of the present invention, a primitive list or lists can be and preferably is or are cached by or in the graphics processor, most preferably by the primitive selection unit, i.e. the primitive lists can be and preferably are stored in a local, more rapidly accessible memory of the graphics processor. Thus, the apparatus and method of the present invention preferably include means for or a step of caching a primitive list or lists. Such caching can reduce bandwidth usage in respect of the primitive lists.

Preferably higher level (lower resolution) primitive lists, i.e. lists that are for plural sub-regions of the scene, are cached. Caching such primitive lists is advantageous, because they will be reused when processing different sub-regions (tiles), unlike primitive lists that are exclusive to (unique to) a single sub-region (which will accordingly be used once only), and so by caching these primitive lists, a more efficient process can be achieved. Indeed, it is an advantage of the present invention that it facilitates the caching of primitive lists, and thus the more efficient caching of primitive data.

As well as caching primitive lists discussed above, other data could also be cached if desired. Indeed, in a particularly preferred embodiment, vertex data (vertices) are cached in the above manner, as well as (or instead of) the primitive lists. This again has the advantage that vertex data that may be used for more than one sub-region can be stored locally (cached) for use, rather than needing to be retrieved from external memory each time it is required.

The cached data may be stored in the same or different caches, as is known in the art.

Where primitive limits and/or vertex (or other) data is cached in this fashion, the storing of (and in particular the replacement of) data in the cache is preferably based on the level in the "sets of sub-regions" hierarchy for which the data applies (e.g. whether it is stored for a single sub-region only or for a set of plural sub-regions (and, e.g., how many sub-regions there are in the set)), rather than, e.g. on a simple first-in, first-out basis. This facilitates preferentially retaining in the cache data that may be required for plural sub-regions. Preferably the higher the level that the data is stored for, the lower its priority for replacement. Thus the "layer" (level) hierarchy is preferably used to prioritise the replacement of data in the cache.

In a particularly preferred embodiment, the rendering order of the individual sub-regions is selected, and preferably predetermined, so as to enhance the efficient usage of any cached data. Most preferably the rendering order is selected so that the sub-regions are rendered in such a fashion that a given set of sub-regions in one layer is completely rendered before the next set of sub-regions in the layer is rendered. This will help to ensure that all the data for a given set of sub-regions can be used and then safely discarded before the rendering of the next set of sub-regions is started.

In other words, it is preferred to render the individual sub-regions in an order that ensures that the boundaries between different sets of sub-regions in a given layer are not crossed until all the sub-regions in the first set of sub-regions have been rendered. This helps to ensure that the data stored for a respective set of sub-regions need only be cached for the minimum length of time.

Where, as discussed above, the arrangement is such that successive layers have 1×1, 2×2, 4×4, 8×8, etc., sub-regions in their sets of sub-regions, then this can be achieved by rendering the sub-regions in Morton order.

Although the present invention has been described above with reference to the storing of primitive lists for individual sub-regions or sets of more than one sub-region, it would also or instead be possible to store other graphics data on a similar basis. For example, there are other forms of graphics data, such as graphics, e.g. rendering, settings, such as scissoring parameters and primitive type parameters (e.g. whether a primitive is a point, line, triangle or quad) and sub-region (tile) commands (e.g. a final tile command), that may be specified on a per sub-region (tile) or group of sub-regions basis.

The Applicants have recognised that it could equally be advantageous to be able to store (selectively) these types of data either on a per sub-region basis, or for plural sub-regions in common, in a similar manner to the primitive lists discussed above.

For example, if a particular parameter or command is to be used for each and every sub-region, it may be preferable to store it in a single primitive (or other) list that is to be used for the whole scene in common. On the other hand, for a command or data that is needed for one or a few sub-regions only, it may be preferable to store it in respect of those sub-region(s) only, e.g. at a lower level in the hierarchy that encompasses the relevant sub-region(s) only.

Thus, the system of the present invention can preferably also store data and commands other than primitives in the manner described above for preparing the primitive lists (for example, and preferably, in separate "lists" for individual sub-regions and for sets of plural sub-regions of the scene). Preferably these commands and data are stored at the level in the sub-regions and sets of sub-regions hierarchy at which they will be used or are needed, as exemplified above.

In these arrangements, the graphics data (e.g. commands and settings) could, for example, be stored in separate, e.g., "commands", lists for the sub-regions and sets of sub-regions. However, in a particularly preferred embodiment, this graphics data is included in the primitive lists for the sub-regions and sets of sub-regions, i.e. such that a and preferably each primitive list can and will include a list of primitives together with other graphics data, such as commands, settings and/or parameters interspersed within the list of primitives.

In a particularly preferred embodiment, this other graphics data is indexed in a similar manner to the primitives, as this will again allow the data to be used in the correct order. Again, a separate index could be used for this data, but most preferably it is indexed within the indexing of the primitives, i.e. such that, for example, the system will (where, for example, a command is to be executed after the first three primitives have been rendered) render primitives 1, 2, 3, then execute command 4, then render primitives 5, 6, . . . , and so on.

It is believed that the storing of data in this manner may be new and advantageous in its own right.

Thus, according to a twenty-third aspect of the present invention, there is provided an apparatus for sorting data and/or commands for use for rendering in a graphics processing system in which a scene to be rendered is divided into a plurality of sub-regions for rendering, the apparatus comprising:

means for preparing, for a single sub-region of the scene, a set of data and/or commands for use when rendering the sub-region; and means for preparing, for a set of sub-regions comprising more than one sub-region of the scene, a set of data and/or commands for use when rendering the sub-regions of the set of sub-regions.

According to a twenty-fourth aspect of the present invention, there is provided a method of sorting data and/or commands for use for rendering in a graphics processing system in which a scene to be rendered is divided into a plurality of sub-regions for rendering, the method comprising preparing, for a single sub-region of the scene, a set of data and/or commands for use when rendering the sub-region; and preparing, for a set of sub-regions comprising more than one sub-region of the scene, a set of data and/or commands for use when rendering the sub-regions of the set of sub-regions.

According to a twenty-fifth aspect of the present invention, there is provided an apparatus for sorting data and/or commands for use for rendering in a graphics processing system in which a scene to be rendered is divided into plural sub-regions for rendering, the apparatus comprising:

means for including data or a command for use for rendering at least in a set of data and/or commands for use for rendering a single sub-region of the scene or in a set of data and/or commands to be used for rendering more than one sub-region of the scene.

According to a twenty-sixth aspect of the present invention, there is provided a method of sorting data and/or commands for use for rendering in a graphics processing system in which a scene to be rendered is divided into plural sub-regions for rendering, the method comprising:

selectively including data or a command for use for rendering at least in a set of data and/or commands to be used for rendering a single sub-region of the scene or in a set of data and/or commands to be used for rendering more than one sub-region of the scene.

According to a twenty-seventh aspect of the present invention, there is provided an apparatus for sorting data and/or commands for use for rendering in a graphics processing system in which a scene to be rendered is divided into sub-regions for rendering, the apparatus comprising:

means for including data or a command for use for rendering in one or more sets of data and/or commands for use for rendering, wherein the sets of data and/or commands for rendering can be exclusive to a single sub-region only or can be used for more than one sub-region of the scene.

According to a twenty-eighth aspect of the present invention, there is provided a method of sorting data and/or commands for use for rendering in a graphics processing system in which a scene to be rendered is divided into sub-regions for rendering, the method comprising:

including data and/or a command for use for rendering in one or more sets of data and/or commands for use for rendering, wherein the sets of data and/or commands for use for rendering can be exclusive to a single sub-region only or can be used for more than one sub-region of the scene.

According to a twenty-ninth aspect of the present invention, there is provided an apparatus for sorting data and/or commands for use for rendering in a graphics processing system in which a scene to be rendered is divided into plural sub-regions for rendering, the apparatus comprising:

means for selectively including data and/or commands for rendering in a set of data and/or commands for use for rendering corresponding to a single sub-region of the scene to be rendered, and/or in a set of data and/or commands for use for rendering corresponding to more than one sub-region of the scene to be rendered.

According to a thirtieth aspect of the present invention, there is provided a method of sorting data and/or commands for use for rendering in a graphics processing system in which a scene to be rendered is divided into plural sub-regions for rendering, the method comprising:

selectively including data and/or commands for use for rendering in a set of data and/or commands for use for rendering corresponding to a single sub-region of the scene to be rendered, and/or in a set of data and/or commands for use for rendering corresponding to more than one sub-region of the scene to be rendered.

According to a thirty-first aspect of the present invention, there is provided a method of processing a stream of graphics data elements, the method comprising:

distributing data elements from the stream of graphics data elements across multiple processing units operating in parallel; and recombining the distributed data elements into a single stream of graphics data elements.

According to a thirty-second aspect of the present invention, there is provided an apparatus for processing a stream of graphics data elements, the apparatus comprising:

means for distributing data elements from the stream of graphics data elements across multiple processing units operating in parallel; and means for recombining the distributed data elements into a single stream of graphics data elements.

According to a thirty-third aspect of the present invention, there is provided a method of processing a stream of graphics data elements, the method comprising:

allocating an index to data elements in the stream of graphics data elements;

distributing data elements from the stream of graphics data elements across multiple processing units operating in parallel; and using the indices allocated to the data elements to sort the data elements after they have been processed by the processing units operating in parallel.

According to a thirty-fourth aspect of the present invention, there is provided an apparatus for processing a stream of graphics data elements, the apparatus comprising:

means for allocating an index to data elements in the stream of graphics data elements;

means for distributing data elements from the stream of graphics data elements across multiple processing units operating in parallel; and means for using the indices allocated to the data elements to sort the data elements after they have been processed by the processing units operating in parallel.

According to a thirty-fifth aspect of the present invention, there is provided a method of processing a stream of graphics data elements, the method comprising:

allocating an index to data elements in the stream of graphics data elements;

distributing data elements from the stream of graphics data elements across multiple processing units operating in parallel;

processing data elements from the stream of graphics data elements; and using the indices allocated to the data elements to control the order in which the data elements are processed.

According to a thirty-sixth aspect of the present invention, there is provided an apparatus for graphics data elements, the apparatus processing a stream of graphics comprising:

means for allocating an index to data elements in the stream of graphics data elements;

means for distributing data elements from the stream of graphics data elements across multiple processing units operating in parallel;

means for processing data elements from the stream of graphics data elements; and means for using the indices allocated to the data elements to control the order in which the data elements are processed.

As will be appreciated by those skilled in the art, the above aspects of the present invention can, and preferably do, include one or more of all of the preferred and optional features of the invention described herein. Thus, for example, the data and/or commands stored for a sub-region or for a set of more than one sub-region, preferably comprises a list of primitives to be rendered for the sub-region or set of sub-regions, and/or other data or commands that are to be used for the sub-region or set of sub-regions. In a preferred embodiment, it comprises both a list of primitives to be rendered and other data and commands to be used for a sub-region or set of sub-regions. Similarly, the graphics data elements preferably comprise graphics primitives and/or other graphics data and/or commands.

It should also be noted here that although references herein to "primitives" are primarily intended to refer to graphics primitives in the form of "simple" polygons such as triangles, grids, lines or points, etc., as is known in the art (and, in a preferred embodiment, do refer to graphics primitives in the form of "simple" polygons such as triangles, quads, lines or points), the present invention is also applicable to larger graphics objects or primitives, such as graphics components or primitives that are intended to represent larger objects in the scene and/or groups of smaller polygons (such as a group of contiguous triangles). For example, it may be desired to process and sort a group of plural individual polygons as a single graphical object or primitive. Such larger, "complex" primitives ("meta-primitives") can equally be listed for sub-regions and sets of plural sub-regions in the manner of the present invention. Thus references herein to "primitives", etc., should, unless the context otherwise requires, be interpreted accordingly.

The various functions of the present invention can be carried out in any desired and suitable manner. In a particularly preferred embodiment they are carried out on a single graphics processing platform that generates and outputs the graphics data that is written to the frame buffer for the display device. The functions can be implemented in hardware or software, as desired. In a preferred embodiment the system is implemented as a hardware element (e.g. ASIC). Thus, in another aspect the present invention comprises a hardware element including the apparatus of, or operated in accordance with the method of, any one or more of the aspects of the invention described herein.

It should also be noted here that, as will be appreciated by those skilled in the art, the various functions, etc., of the present invention may be duplicated and/or carried out in parallel on a given processor. There may be, for example, plural primitive selection units operating in parallel.

The present invention is applicable to any form or configuration of graphics processor and renderer, such as renderers having a "pipelined" arrangement (in which case the renderer will be in the form of a rendering pipeline).

As will be appreciated from the above, the present invention is particularly, although not exclusively, applicable to 3D graphics processors and processing devices, and accordingly extends to a 3D graphics processor and a 3D graphics processing platform including the apparatus of, or operated in accordance with the method of, any one or more of the aspects of the invention described herein. Subject to any hardware necessary to carry out the specific functions discussed above, such a 3D graphics processor can otherwise include any one or more or all of the usual functional units, etc., that 3D graphics processors include.

It will also be appreciated by those skilled in the art that all of the described aspects and embodiments of the present invention can include, as appropriate, any one or more or all of the preferred and optional features described herein.

The methods in accordance with the present invention may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data-processing system. The invention also extends to a computer software carrier comprising such software which when used to operate a graphics processor, renderer or microprocessor system comprising data processing means causes in conjunction with said data processing means said processor, renderer or system to carry out the steps of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A number of preferred embodiments of the present invention will be described by way of example only and with reference to the accompanying drawings, in which.

A preferred embodiment of the present invention will now be described with reference to FIGS. 2, 3 and 4.

Figure 1:
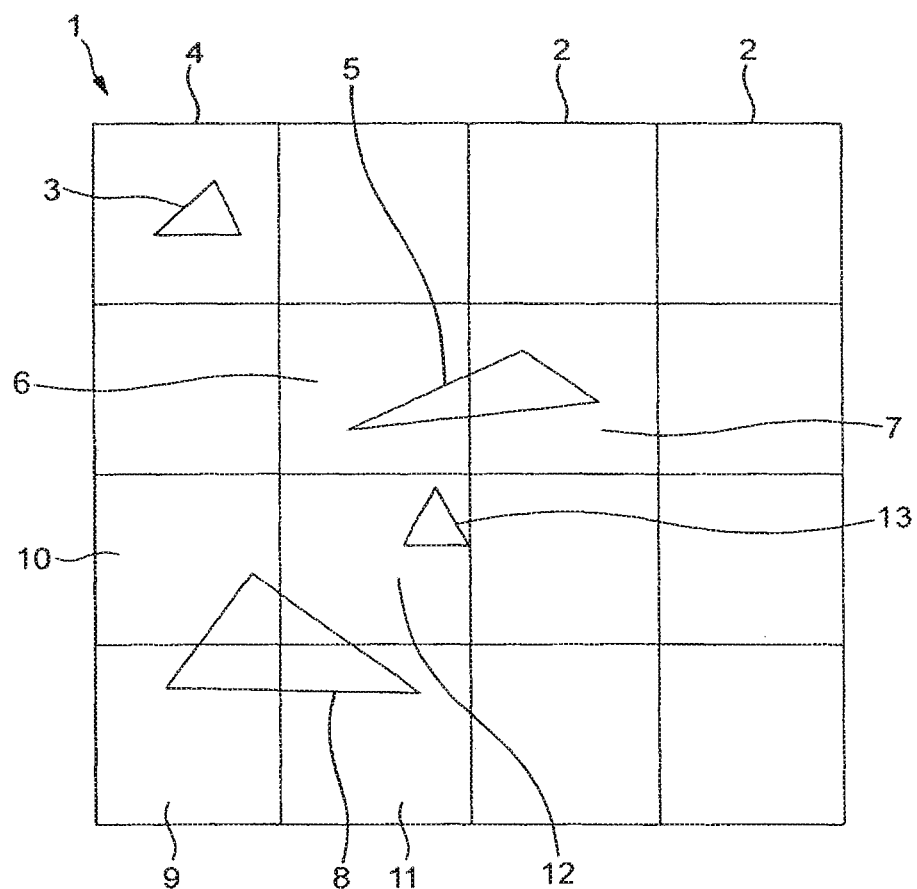
FIG. 1 shows schematically a tile-based graphics-processing arrangement.
Figure 2:
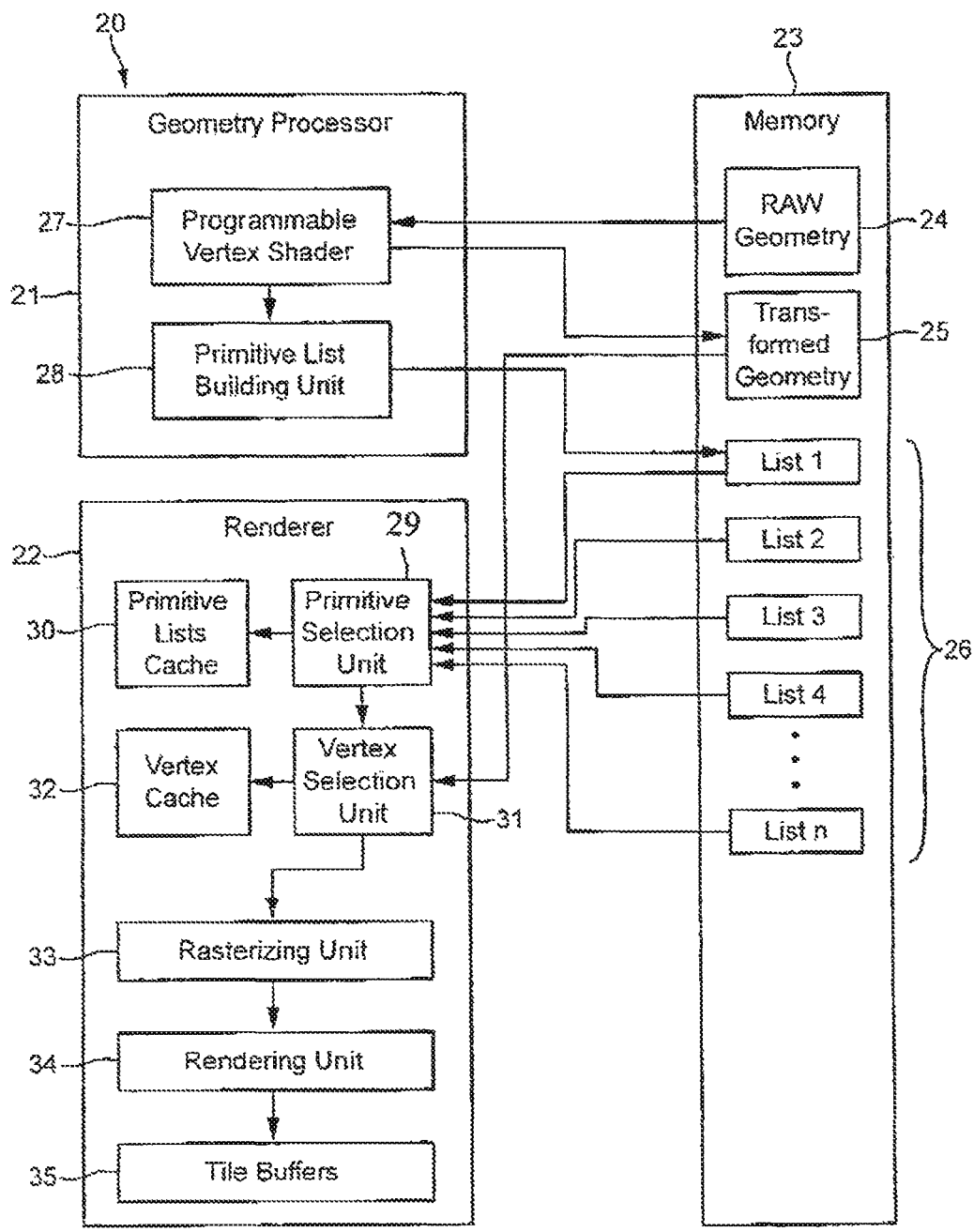
FIG. 2 shows schematically an arrangement of a graphics processor that can operate in accordance with the present invention.

FIG. 2 shows schematically a graphics processor 20 that may be operated in accordance with the present invention. The graphics processor 20 includes a geometry processor 21, and a renderer 22, both of which can access a memory 23. The memory 23 may be, as is known in the art, "on-chip" with the geometry processor 21 and renderer 22, or may be an external memory that can be accessed by the geometry processor 21 and renderer 22.

The memory 23 stores, inter alia, and as shown in FIG. 2, a set of raw geometry data 24 (which is, for example, provided by the graphics processor driver or an API running on a host system (microprocessor) of the graphics processor 20, as is known in the art), a set of transformed geometry data 25 (which is the result of various transformation and processing operations carried out on the raw geometry 24, again, as is known in the art), and a set of primitive lists 26. The primitive lists 26 are prepared in accordance with the present invention. This process will be described in more detail below.

The transformed geometry data 25 comprises, for example, transformed vertices (vertex data), etc., as is known in the art.

The geometry processor 21 comprises, inter alia, a programmable vertex shader 27, and a primitive list building unit 28. The programmable vertex shader 27 takes as it input the raw geometry data 24 stored in the memory 23, and processes that data to provide transformed geometry data 25 (which it then stores in the memory 23) comprising the geometry data in a form that is ready for 2D placement in the frame to be displayed. The programmable vertex shader 27 and the processes it carries out can take any suitable form and be any suitable and desired such processes known in the art.

The primitive list building unit 28 carries out the process of the present invention of allocating the primitives to the primitive lists which are then used by the renderer 22 to identify the primitives that should be rendered for each sub-region of the scene to be rendered. To do this, the primitive list building unit 28 takes as its input the transformed and processed vertex data from the programmable vertex shader 27 (i.e. the positions of the primitives in the scene), builds primitive (tile) lists using that data, and stores those lists as the primitive lists 26 in the memory 23. This process will be described in more detail below.

The renderer 22 includes a primitive selection unit 29, a primitive list cache 30, a vertex selection unit 31, a vertex data cache 32, a rasterising unit 33, a rendering unit 34, and tile buffers 35.

The rasterising unit 33, rendering unit 34, tile buffers 35 operate, in this embodiment, in the same manner as such units operate in existing graphics processing systems. Thus the rasterising unit 33 takes as its input a primitive and its vertices, rasterises the primitive to fragments, and provides those fragments to the rendering unit 34. The rendering unit 34 then performs a number of rendering processes, such as texture mapping, blending, shading, etc. on the fragments, and generates rendered fragment data which it stores in the tile buffers 35 for providing to a frame buffer for display.

The primitive selection unit 29 of the renderer 22 determines which primitive is to be rendered next. It does this by considering the primitive lists 26 stored in the memory 23, and selecting from one of those lists the next primitive to be rendered. This selection process again will be described in more detail below.

The primitive selection unit 29 can also place one or more primitive lists in the primitive list cache 30.

The primitive selection unit 29 provides the primitive that it has selected for rendering next to the vertex selection unit 31. In response to this, the vertex selection unit 31 retrieves the appropriate transformed vertex data for the primitive in question from the transformed geometry data 25 stored in the memory 23, and then provides the primitive (i.e. its transformed vertex data) to the rasterising unit 33 for processing. The vertex selection unit 31 can cache vertex data that it has retrieved from the memory 23 in the vertex data cache 32, if desired.

The operation of the primitive list building unit 28 and the preparation of the primitive lists 26 will now be described in more detail with reference to FIGS. 3, 4 and 5.

As discussed above, the present invention is applicable to a rendering system in which the scene to be rendered is divided into plural sub-regions or tiles. Furthermore, as well as the scene being divided into the individual sub-regions, the sub-regions can be grouped together in sets of more than one sub-region which thereby in effect cover a greater portion of the screen area than a single sub-region. Furthermore, a separate (different) primitive list (i.e. a list of primitives to be rendered) can be and is prepared from each individual sub-region, and for each set of plural sub-regions that the system supports.

Figure 4:
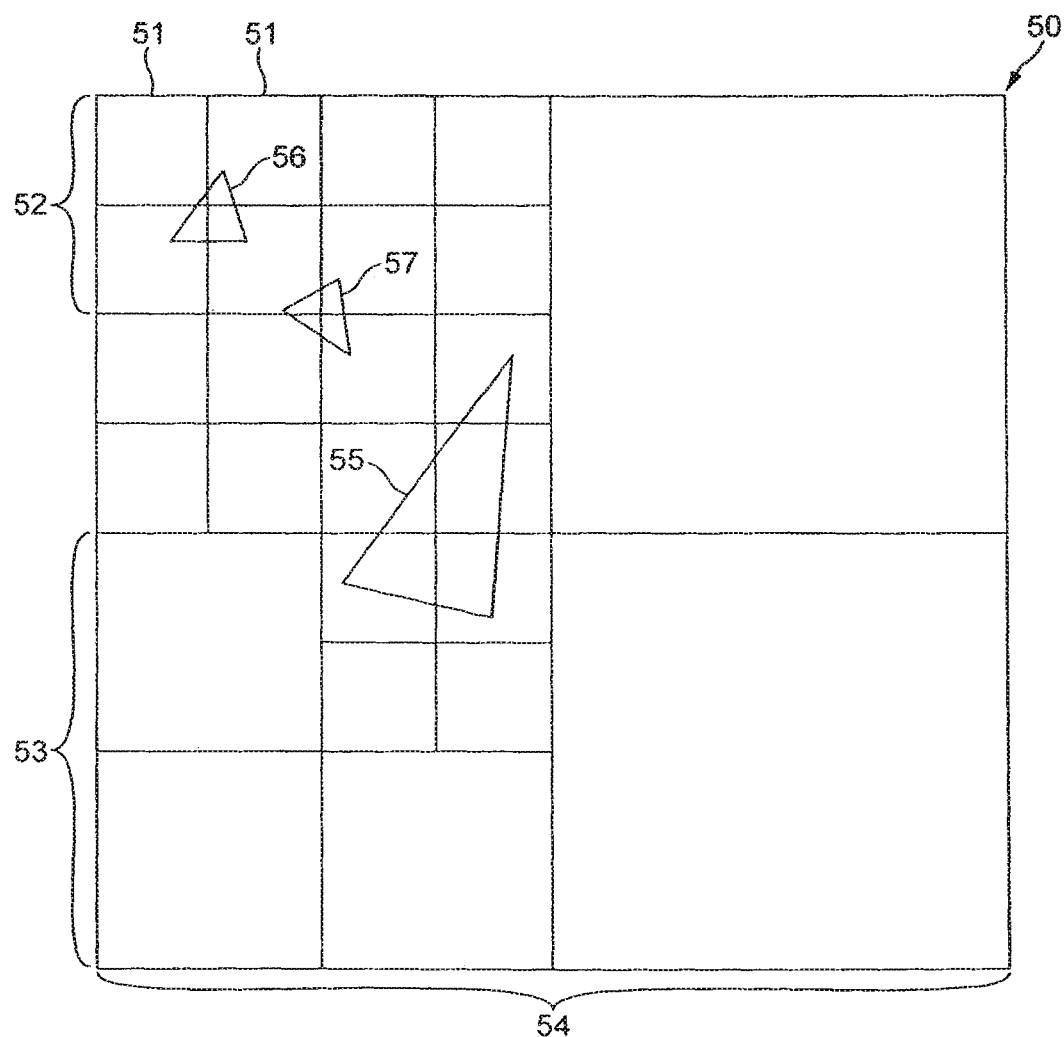
FIG. 4 shows schematically a set of primitives in a scene to be rendered.
Figure 5:
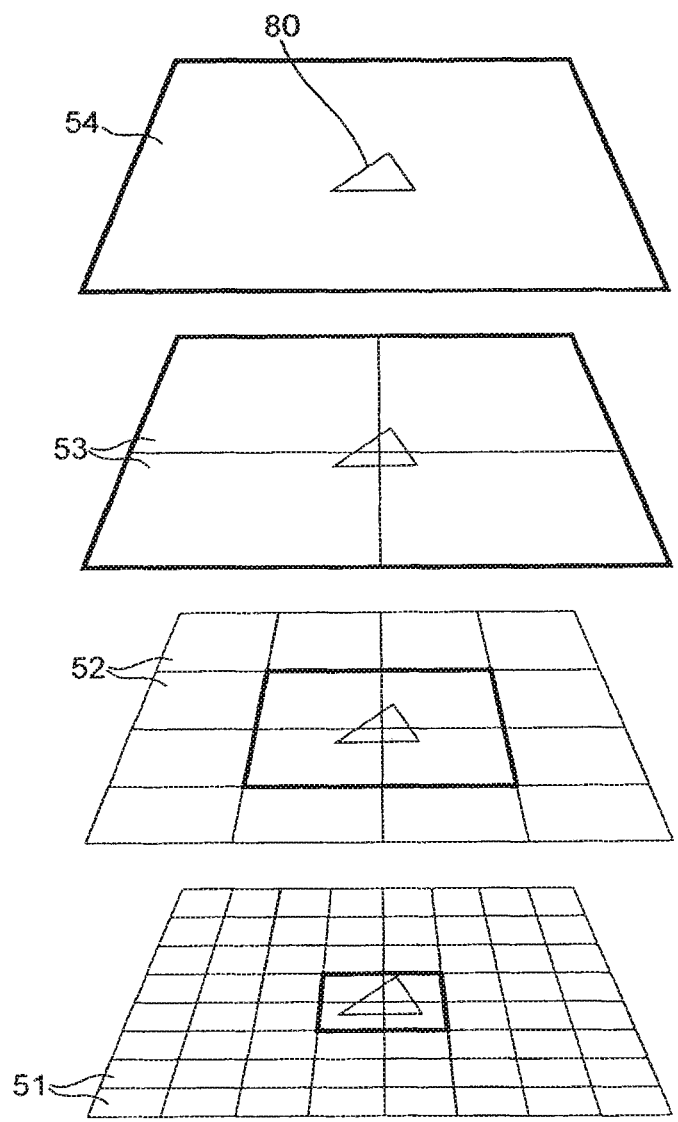
FIG. 5 shows schematically an embodiment of an arrangement of sets of sub-regions of a scene to be rendered.

FIGS. 4 and 5 illustrate a preferred embodiment of an arrangement of sub-regions and sets of sub-regions of a scene to be rendered that can be used with the present invention.

As shown in FIG. 4, the scene 50 to be rendered is divided into plural individual sub-regions or tiles 51. (It should be noted here that FIG. 4 does not show all the individual sub-regions 51 that the scene 50 is divided into, but only a few of those sub-regions. This is for clarity purposes. However, the entire scene 50 is divided into equal sub-regions 51 in practice.)

The individual sub-regions 51 are also grouped into differing groups of sets of plural sub-regions, which groups of sets of sub-regions are in effect laid over the scene 50 to provide different layers having different divisions of the overall scene area. Thus, as shown in FIG. 4, there is a "layer" of sixteen sets 52 of sub-regions each comprising 2×2 sub-regions 52. There is then another, lower resolution layer comprising four sets 53 of 4×4 sub-regions. Finally, there is one set 54 of 8×8 sub-regions which encompasses the entire scene area.

As can be seen from FIG. 4, the effect of this arrangement is that the scene 50 is overlaid with a progressively increasing hierarchy of screen area divisions. This is shown schematically in FIG. 5. Thus there is a top level layer comprising a set 54 of 8×8 sub-regions which encompasses the entire scene area 50. There is then a group of four 4×4 sets of sub-regions 53, then a group of sixteen 2×2 sets of sub-regions 52, and finally a layer comprising the 64 single sub-regions 51. FIG. 5 also shows in bold for illustrative purposes the sub-regions or sets of sub-regions that a primitive 80 would be considered to fall within at each layer (level) in the hierarchy.

FIG. 4 also shows for illustrative purposes three primitives 55, 56 and 57 which are to be rendered and which accordingly need allocating to primitive lists for rendering.

(Again, as will be appreciated by those skilled in the art, in practice any given scene to be rendered will typically comprise many more primitives than the three primitives shown in FIG. 4. However, FIG. 4 shows three primitives only for simplicity and clarity purposes.)

As discussed above, and as is known in the art, in a system where the scene 50 to be rendered is divided into smaller sub-regions 51 for rendering purposes, it is necessary for the system to be able to identify which primitives should be rendered for each sub-region. This is done, as is known in the art, by providing so-called primitive or tile lists, which identify for each sub-region the primitives that should be rendered for that sub-region.

As discussed above, the present embodiment provides an improvement over existing primitive list preparing processes, since as well as allowing primitive lists to be prepared for the individual sub-regions that the scene is divided into, the present embodiment also prepares individual primitive lists for sets of more than one sub-region, i.e. primitive lists that are to be used for plural sub-regions in common.

In the present embodiment, the primitive list building unit 28 prepares a primitive list for each individual sub-region 51, a separate primitive list for each set of 2×2 sub-regions 52, a separate primitive list for each set of 4×4 sub-regions 53, and a separate primitive list for the set of 8×8 sub-regions 54 that covers the entire scene 50. To do this, the primitive list building unit 28 takes each primitive in turn, determines a location for that primitive, compares the primitive's location with the locations of (the scene area covered by) the sub-regions 51 and the locations of (the scene area covered by) the sets of sub-regions 52, 53 and 54, and allocates the primitive to the respective primitive lists 26 for the sub-regions and sets of sub-regions accordingly.

The primitive list building unit 28 determines the location of each primitive and accordingly the sub-regions and sets of sub-regions that a given primitive falls within or intersects using, in this embodiment, an exact binning technique. Thus, as is known in the art, the primitive list building unit 28 uses the determined transformed vertex positions it is provided with for a given primitive by the programmable vertex shader 27 to identify which sub-regions and sets of sub-regions the primitive falls within (intersects). This process can be carried out in any suitable and desired manner, such as by using techniques already known for this purpose in the art.

As will be appreciated by those skilled in the art, other techniques for determining and locating the primitives within the scene and in relation to the sub-regions or sets of sub-regions could be used if desired. For example, bounding box techniques could equally be used, as is known in the art. (Where a bounding box technique is used, it is preferred for the bounding box to be generated as part of the primitive listing process, e.g., by the primitive list building unit, but other arrangements would, of course, be possible.)

The actual process that the primitive list building unit uses for allocating a given primitive to the primitive lists 26 for the sub-regions and sets of sub-regions will now be described with reference to FIG. 3.

Figure 3:
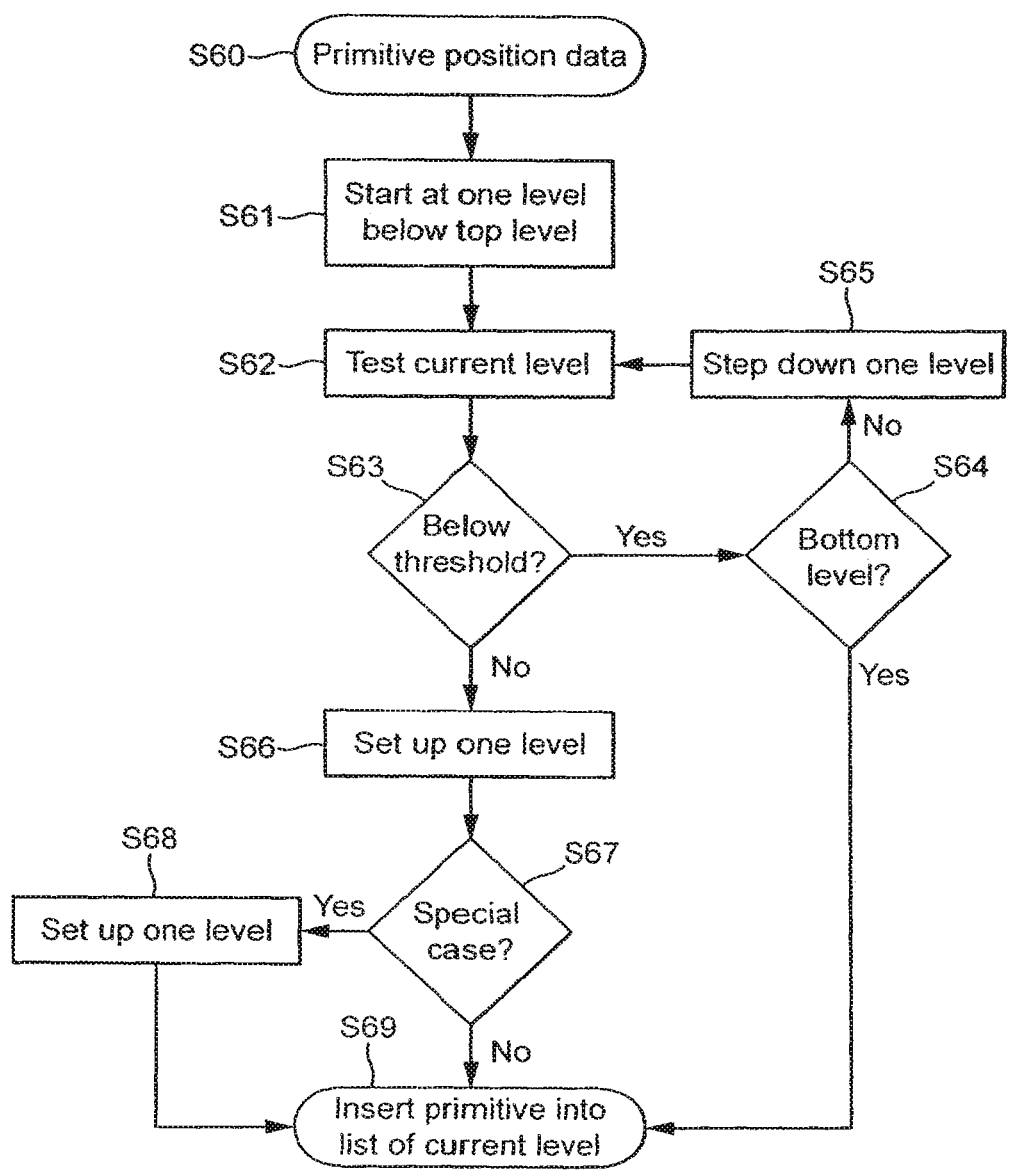
FIG. 3 shows schematically an embodiment of a process for allocating primitives to primitive lists.

As shown in FIG. 3, the primitive list building unit 28 takes at its input the transformed primitive position data from the programmable vertex shader 27 for the primitive in question (step S60).

It then proceeds to test the primitive's position against the sets of sub-regions and sub-regions at each different level (layer) that the scene is divided into. To do this, it starts at the level in the sets of sub-regions' hierarchy which is one level below the top level (step S61). Thus, in the present case, it will test the primitive at the level of the sets 53 of 4×4 sub-regions shown in FIG. 4.

The primitive list building unit 28 then, using the provided primitive position, determines how many sets of sub-regions the primitive would need to be listed for at the current level in the sets of sub-regions' hierarchy (step S62), and compares the determined number of sets of sub-regions with a threshold number of sets of sub-regions, which threshold in the present embodiment is set to 4 (step S63).

If at this stage it is determined that the number of sets of sub-regions that the primitive would need to be listed for at the current level in the sets of sub-regions' hierarchy is below the threshold number (i.e. 4 in the present case), then the primitive list building unit 28 checks if it is at the bottom level (i.e. the single sub-regions level) in the sets of sub-regions' hierarchy (step S64), and, if it is not, steps down to the next level in the hierarchy (step S65), determines how many sets of sub-regions would be needed to list the primitive at that level (step S62) and so on, until such time as it is determined that the number of sets of sub-regions needed at a given level in the hierarchy exceeds the threshold number or it is determined at step S64 that the bottom level of the hierarchy, i.e. the single sub-regions level, has in any event been reached.

When it is determined that a given primitive needs to be listed in more than a threshold number of sets of sub-regions at a given level in the hierarchy, the system then steps up to the preceding level in the hierarchy (step S66). The primitive list building unit 28 then tests if the special case of at the next level up in the hierarchy the primitive would need to be included in a single primitive list only is met (step S67). If this special case is met, then the primitive list building unit 28 steps up to the next higher level in the hierarchy (step S68), and then lists the primitive in the primitive list at that level (step S69), i.e. for the level where the primitive need only be included in a single primitive list.

On the other hand, if at step S67 it is determined that at the next level up the primitives would still need to be listed in more than one primitive list, then the primitive is simply listed at the level immediately above the level where the threshold number of primitive lists was exceeded (step S69).

If at step S64 it is determined that the bottom level of the hierarchy has been reached in any event, even though the threshold number of primitive lists has not been reached, then the primitive is immediately listed at that bottom level (step S69).

This process is then repeated for each primitive in turn.

This arrangement ensures, inter alia, that any given primitive will never be included (listed) in more primitive lists than the specified threshold number of primitive lists. It also, furthermore, ensures that in the special case where a primitive can be included in a single primitive list at the level immediately above the level where it needs to be included in the threshold number of primitive lists, then it is so included in the single list (this allows the primitive to be stored once in the primitive lists and yet still be processed efficiently for the sub-regions that it must be rendered for).

In other words, the primitive list building unit 28 will, starting at the second from highest level in the sets of sub-regions' hierarchy, iteratively work down the sets of sub-regions' hierarchy until such time as it finds that a primitive will need to be included in more than the threshold number of primitive lists, and then go back up one level and list the primitive at that level, except in the special case where going up two levels would allow the primitive to be listed in a single list only. This arrangement has been found by the Applicants to provide a particularly efficient way of preparing primitive lists for use when rendering sub-regions of a scene.

The operation of this process with respect to the primitives shown in FIG. 4 will now be described for illustrative purposes. In this arrangement, it will be assumed that an exact binning technique is used for determining and locating the primitives in the scene, although, as discussed above, other techniques, such as the use of bounding boxes, would be possible if desired. In this example, it is assumed that the threshold number of primitive lists for the purposes of determining at what level to list a primitive is four (a different threshold number would, of course, be possible if desired).

Taking firstly the primitive 55 shown in FIG. 4, the primitive list building unit 28 would first determine how many of the sets 53 of 4×4 sub-regions the primitive 55 would need to be listed in.

In this case, the primitive list building unit 28 will determine that the primitive 55 would need to be listed in two such sets of 4×4 sub-regions 53.

As this does not exceed the threshold number of four primitive lists, the primitive list building unit then steps down to the next level in the hierarchy, namely the level of the sets 52 of 2×2 sub-regions. In this case, the primitive list building unit again determines that the primitive 55 would need to be listed in the primitive list of two of the sets 52 of 2×2 sub-regions, which again does not exceed the threshold number of four primitive lists.

The primitive list building unit 28 accordingly steps down to the next level in the hierarchy, which is the single sub-regions 51 level. In this case, it will determine that the primitive 55 would need to be listed in five single sub-region primitive lists, which exceeds the threshold number of four lists. Thus, upon determining this, the primitive list building unit 28 will step back up to the level of the sets 52 of 2×2 sub-regions, and list the primitive 55 at that level, namely include it in the primitive lists for each of the appropriate two sets 52 of 2×2 sub-regions. It should also be noted in this case that when the primitive list building unit 28 tests for the special case, it will determine that the primitive 55 is not included in the threshold number of primitive lists at the level at which it is being listed, and so therefore does not fall within the special case set out above.

Turning now to the primitive 56, again the primitive list building unit 28 will first test that primitive at the set 53 of 4×4 sub-regions' level, and accordingly determine that the primitive will need to be listed in the primitive list of one such set of sub-regions.

The primitive list building unit 28 will accordingly step down to the next level of the sets 52 of 2×2 sub-regions, and again determine that at that level the primitive 56 would need to be included in the list of one such set of 2×2 sub-regions.

The primitive list building unit 28 will accordingly step down to the final, single sets of sub-regions 51 level, and determine that at that level the primitive 56 would need to be listed in the primitive lists for four single sub-regions 51.

The primitive list building unit would then test whether the primitive 56 meets the special case specified above.

In this case, at the level of the single sub-regions 51, the primitive 56 does need to be listed in the threshold number of primitive lists (i.e. four primitive lists), and accordingly the primitive list building unit 28 will step to the next higher level, namely the sets 52 of 2×2 sub-regions, to determine whether at that level in the hierarchy the primitive 56 would need to be included in a single primitive list only. In the case of the primitive 56, this test would be met, i.e. the primitive 56 would only need to be listed in a single primitive list at the level of the sets 52 of 2×2 sub-regions. Accordingly, the primitive list building unit 28 will list the primitive 56 at the level of the sets 52 of 2×2 sub-regions, rather than at the single sub-regions 51 level.

Finally, with regard to the primitive 57, the primitive list selection unit would again test that primitive firstly at the sets 53 of 4×4 sub-regions, and determine that at that level it would only need to be included in a single primitive list. It would accordingly then test the primitive 57 again at the sets 52 of 2×2 sub-regions, and find that at that level it would need to be included in the primitive lists of four sets of 2×2 sub-regions.

The primitive list selection unit would accordingly then test the primitive 57 at the single sets of sub-regions level 51, and again find that at that level it would need to be included in four primitive lists.

The primitive list building unit 28 would then test if the primitive 57 meets the special case criteria described above. In this case, the primitive 57 at the level above the single sets of sub-regions level 51 would need to be included in four primitive lists for the sets 52 of 2×2 sub-regions, and so the special case is not met. The primitive list building unit 28 would accordingly list the primitive 57 at the single sub-regions 51 level, namely in the primitive lists of the four single sub-regions 51 that the primitive 57 falls within.

As will be appreciated by those skilled in the art, the above process is repeated by the primitive list building unit 28 for each and every primitive in the scene to be rendered in turn, until complete tile lists 26 have been generated for each single sub-region, and for each set of more than one sub-region, that the scene to be rendered can be divided into.

The primitive list building unit 28 places the primitives in the primitive lists 26 in the order that it receives the primitives from the programmable vertex shader 27. This means that, so far as each individual primitive list 26 is concerned, the primitives in the list are in the order that they were generated, which will, as is known in the art, typically correspond to the desired order of rendering the primitives. (As is known in the art, when primitives are generated for rendering, they are usually generated by the host driver or API in the order that it is desired to render the primitives and are provided to the graphics processor in that order. Thus, as the primitive list building unit 28 takes the primitives in turn as they are received, it will place the primitives in the individual tile lists in rendering order so far as each individual primitive list is concerned.)

The primitive list building unit 28, at the same time as it places a primitive in the appropriate primitive list or lists, also allocates to and associates with the primitive in the primitive list 26 an index for the primitive. The primitive list building unit 28 has a counter for this purpose, and simply allocates to the primitives as they are rendered the current count of the counter. In this way, each primitive is numbered (in ascending order in this embodiment) with the order in which it was received by the primitive list building unit 28 (i.e. in the order in which the primitives are provided by the host driver or API, etc., i.e. the order in which it is desired for the primitives to be rendered). The indices allocated by the primitive list building unit 28 to each primitive are used by the primitive selection unit 29, as will be discussed further below, to identify and select the next primitive for rendering from the primitive lists 26 in the memory 23.

This indexing of the primitives as they are placed in the primitive lists 26 is desirable, because, as is known in the art, and as discussed above, it is usually desired in graphics processing systems to render the primitives in a particular order. This is not a problem where there is only a single primitive list from which to take primitives for rendering, since in that case, as discussed above, the primitives will be included in the primitive list in the order that they are provided to the graphics processor, i.e. in the desired order for rendering. However, where, as in the present embodiment, the next primitive for rendering may need to be selected from more than one primitive list, selecting the primitives in the correct order for rendering may not be so straightforward. Indexing the primitives in the manner discussed above helps to alleviate this difficulty, since it allows, as will be discussed further below, the primitive selection unit 29 to identify the order that the primitives were provided to the graphics processor for rendering, and accordingly, to select the next primitive in the order.

Although in this embodiment the primitives are simply indexed in ascending order, it would be possible to use other indexing arrangements, if desired. For example, where the primitives to be rendered are arranged in draw calls, the individual draw calls could be numbered consecutively, and then the primitives within each draw call numbered consecutively. Such an arrangement would facilitate, for example, processing different draw calls in parallel.

The primitive list building unit 28 is also configured to identify when the indexes it can allocate to the primitives have been or are about to be exhausted. In particular, it is able to identify when the penultimate index value (i.e. the penultimate counter value) has been reached. In response to this event, the primitive list building unit switches to an arrangement in which it allocates all the primitives it receives for listing from then on at the same level in the sets of sub-region's hierarchy (e.g. always at the single sub-regions level, or always at the sets of 2×2 sub-regions level, etc.). This ensures that when the possibility of indexing the primitives in order has been exhausted, the primitive selection unit 29 will then only ever be provided with primitives at the same level in the sets of sub-region's hierarchy, such that it can still select the primitives in the correct order (since it will not then need to choose between primitives from primitive lists 26 at different levels in the hierarchy).

The actual level at which the primitives are listed in this arrangement once the index has been exhausted can be selected as desired. It may be based on, for example, a desired compromise or trade-off between having to store more primitive lists if the primitives are listed at a lower level in the hierarchy (i.e. for smaller scene areas) (which would require more memory) and having to perform more redundant and unnecessary processing of primitives at the rendering stage if the primitives are listed at a higher level in the hierarchy (i.e. for larger scene areas).

The primitive list building unit 28 also in these circumstances allocates to every primitive that it subsequently receives for listing the highest index (highest count number), as that then allows the system to identify that the "index exhausted" state has been reached.

Once the primitive list building unit 28 has finished building the primitive lists 26 and stored those lists in the memory 23, and the programmable vertex shader 27 has completed the transformation of the geometry data to provide a complete set of transformed geometry data 25 in the memory 23, for the scene to be rendered, the renderer 22 can then render the scene. This process will now be described below.

As discussed above, in the present embodiment, the rendering process is performed on a sub-region by sub-region basis, i.e. each sub-region (tile) 51 of the scene is rendered individually in turn, and then the rendered sub-regions (tiles) combined for display.

Thus, the renderer 22 is first provided with the identity of the sub-region to be rendered and uses this to configure itself appropriately. In particular, the stored primitive lists 26 that apply to the sub-region that is to be rendered, i.e., in the present embodiment, the primitive list that is exclusive to the individual sub-region that is to be rendered, the primitive list for the set of 2×2 sub-regions that includes the sub-region that is to be rendered, the primitive list for the set of 4×4 sub-regions that includes the sub-region that is to be rendered, and the primitive list for the complete set 54 of 8×8 sub-regions that covers the entire scene to be rendered (and, accordingly, must cover the individual sub-region that is currently to be rendered) are identified. In the present embodiment, the stored primitive lists that apply to the sub-region (tile) being rendered are indicated by including pointers to the relevant primitive lists in the "new tile" command that is sent when a sub-region (tile) is first to be rendered. (Other arrangements would, of course, be possible.)

The renderer then proceeds to render the sub-region (tile) in question.

The first stage in the rendering process is for the primitive selection unit 29 to select a primitive to be rendered. To do this, the primitive selection unit 29 reads the stored primitive lists 26 that have been determined as applying to the sub-region that is currently being rendered, i.e., in the present embodiment, as discussed above, the primitive list 26 that is exclusive to the individual sub-region that is being rendered, the primitive list for the set of 2×2 sub-regions that includes the sub-region that is being rendered, the primitive list for the set of 4×4 sub-regions that includes the sub-region that is being rendered, and the primitive list for the complete set 54 of 8×8 sub-regions that covers the entire scene to be rendered. The primitive lists are read in a first-in, first-out order by the primitive selection unit 29, i.e. such that, in effect, the first primitive in a list is read, and then, once that primitive has been sent for rendering, the second primitive in the list is read, and so on.

To select the next primitive to be rendered, the primitive selection unit 29 determines the index that have been allocated to the next primitive to be rendered in each primitive list for the sub-region being rendered, compares those indices, and selects the lowest index primitive as the next primitive to be rendered (since, as discussed above, the primitives are indexed by the primitive list building unit 28 in ascending order, i.e. such that the lowest numbered primitive is the next primitive to be rendered for the desired rendering order).

Thus the primitive selection unit 29 will read in the index of the next primitive in the primitive list for the sub-region in question, the index of the next primitive in the primitive list for the relevant set of 2×2 sub-regions, the index of the next primitive in the primitive list for the appropriate set of 4×4 sub-regions, and so on, compare those indices, and select the primitive with the lowest index for rendering next. (The primitive selection unit 29 only needs to read the index of one primitive (the next primitive) from each primitive list at any one time, since, as discussed above, within the individual primitive lists, the primitives are already listed in the correct rendering order.) In effect, the primitives can be thought of as being streamed one-by-one to the primitive selection unit in order from the stored primitive lists, on a first-in, first-out basis.

Once the primitive selection unit 29 has selected the primitive to be rendered, it passes that primitive to the vertex selection unit 31. The vertex selection unit 31 then retrieves the appropriate transformed geometry data for the vertices of the primitive in question from the transformed geometry data 25 stored in the memory 23, and provides that data to the rasterising unit 33. The primitive is then rasterised and rendered, as discussed above, and as is known in the art.

The process is then repeated, i.e. the primitive selection unit 29 again reads the index of the next primitive of each relevant primitive list, selects the primitive with the lowest index, and provides that primitive to the vertex selection unit 31, and so on.

This process is repeated for all the primitives that need to be rendered for a given sub-region (i.e. that are included in primitive lists 26 appropriate to the sub-region) until all the primitives for the sub-region have been rendered.

The renderer 22 then proceeds to render the next sub-region in the same manner, and so on, until all the individual sub-regions for the scene have been rendered.

Once all the sub-regions for the scene have been rendered, the rendered sub-regions are combined and provided to a display device for display, as is known in the art.

The primitive selection unit 29 is also configured to be able to identify the situation where the same primitive (i.e. primitives having the same index) appears simultaneously at the current reading position of more than one primitive list that it is currently reading primitives from. This is done by the primitive selection unit comparing the indices and identifying if a match occurs. In these circumstances, the primitive selection unit 29 is configured to select the relevant primitive once for rendering, and to ignore the subsequent duplicate occurrences of that primitive. This avoids a given primitive unnecessarily being rendered more than once for a given sub-region.

As discussed above, the renderer 22 also includes a primitive list cache 30 and a vertex data cache 32. These caches, as is known in the art, comprise local memory provided on the renderer 22 that can be more rapidly accessed by processing units of the renderer (and in particular the primitive selection unit 29 and vertex selection unit 31, respectively) than the main memory 23.

The primitive selection unit 29 is configured to store in the primitive list cache 30 one or more primitive lists 26 that it has read from the main memory 23. In particular, the primitive selection unit 29 preferentially retrieves from the memory 23 and stores in the primitive list cache 30 primitive lists that apply to sets of more than one sub-region of the scene that, for example, the primitive selection unit 29 knows it will require for subsequent sub-regions of the scene. This helps to avoid delays and latency due to the primitive selection unit 29 having to retrieve repeatedly from the memory 23 primitive lists that it will require for rendering sub-regions of the scene.

The vertex selection unit 31 can similarly cache vertex data that it retrieves from the transformed geometry data 25 in the memory 23 in the vertex data cache 32, again in particular where it can be identified that the vertex data will be required for a primitive again (for example because it is known that the primitive is listed for a set of plural sub-regions that are to be rendered).

In the present embodiment, the storing of and in particular the replacement of, the data cached in the primitive list cache 30 and vertex data cache 32 is based on the level in the sets of sub-region's hierarchy to which the primitive list and/or vertex data applies or has been stored in respect of, such that, for example, primitive lists and vertex data that apply to higher levels in the hierarchy (i.e. that will therefore be used for more sub-regions in the scene to be rendered) are preferentially cached and retained in the caches as compared to primitive lists and vertex data that it is known apply, for example, to a single sub-region or only a few sub-regions.

Thus, for example, when the vertex selection unit 31 reads transformed vertices from the transformed geometry data 25 in the memory 23, it will know at what level the primitive that that vertex data applies to has been listed (i.e. the primitive list that the primitive has come from), and can use that information to, for example, decide whether or not to cache the vertex data (e.g., based, as discussed above, on whether or not it is likely that that vertex data will be re-used for subsequent sub-regions).

The order that the sub-regions of the scene are processed by the renderer 22 can be selected as desired. However, in a preferred embodiment, the sub-regions are processed in Morton order, as this facilitates, for example, the more efficient caching of primitive lists and vertex data in the renderer 22.

Although the present embodiment has been described above with particular reference to the preparation of primitive lists for individual sub-regions and sets of sub-regions, it would also be possible to, and indeed is preferred to, store other data that may be used on a sub-region or plural sub-regions basis in a similar manner. Such data could comprise, for example, rendering settings, tiling commands, scissoring parameters, etc. It would be advantageous if, for example, such a command is to be used for every sub-region, to place the command in a list that applies to all the sub-regions together, or, alternatively, if a command only applies to a few sub-regions, to store the command at a lower level in the hierarchy. Preferably, this data is also stored in or associated with the respective primitive lists that are prepared for each sub-region and set of sub-regions, as appropriate, and most preferably is indexed in a similar manner to that discussed above for the primitives.

As will be appreciated by those skilled in the art, the present embodiment (and the present invention) can be implemented in any tile-based rendering system, as desired. The various components and functions of the present embodiment and the present invention can similarly be implemented as desired and using any suitable techniques known in the art.

It can be seen from the above that the present invention, in its preferred embodiments at least, provides an improved primitive listing and sorting arrangement for tile-based rendering systems that in particular facilitates better control over and knowledge of the memory usage and requirements for the tile-listing (primitive sorting (binning)) process. It also provides information about the distribution and layout of primitives in a scene, thereby, e.g., facilitating improved vertex caching, etc., and facilitates the caching of primitive (tile) lists, and the more efficient caching of primitive data.

This is achieved, in the preferred embodiments of the present invention at least, by listing primitives (and other data and commands, if desired) in differing resolution tile lists, namely in tile lists that are exclusive to a single tile, and in tile lists that are to be used for plural tiles in common.

The invention claimed is:

1. A graphics processing system in which a scene to be rendered is divided into a plurality of sub-regions for rendering, each sub-region including a respective area of the scene to be rendered, the system comprising:
primitive list building circuitry configured to prepare lists of primitives for rendering, each list of primitives listing primitives for rendering for one or more sub-regions of the scene;
the primitive list building circuitry further comprising an index generator configured to generate indices for primitives that are included in the primitive lists by the primitive list building circuitry; and
the primitive list building circuitry further being configured to associate with each graphics primitive that it lists in a primitive list, an index for the primitive;
the graphics processing system further comprising:
primitive selection circuitry configured to, when rendering a sub-region of the scene, select from a primitive list a next primitive to be rendered for that sub-region of the scene;
wherein the primitive selection circuitry is configured to:
receive plural different primitive lists simultaneously;
determine which primitive from the plural different primitive lists should be rendered next for a sub-region of the scene using the indices associated with the graphics primitives in the primitive lists; and
select the primitive determined to be the primitive that should be rendered next as the primitive to render next for that sub-region of the scene.

2. The system of claim 1, wherein the primitive selection circuitry is configured to use the primitive indexes to identify when a primitive having an index that it has already passed for rendering for the sub-region of the scene arises, and to, in that event, select a different primitive for rendering for the sub-region of the scene.

3. The system of claim 1, wherein the primitive selection circuitry is configured to, when the primitive lists it receives include the same primitive more than once, select the primitive for rendering only once.

4. An apparatus for rendering a group of graphics primitives for display in a graphics processing system that includes a plurality of geometry processors, the apparatus comprising:
index allocation circuitry configured to allocate an index to each primitive in a group of primitives;
primitive distributing circuitry configured to distribute the primitives from a group of primitives across multiple geometry processors of the graphics processing system, such that different primitives from the group of primitives are processed by different geometry processors of the multiple geometry processors;
primitive group recombining circuitry configured to recombine a group of primitives that have been processed in the geometry processors into a single stream of primitives using the indices allocated to the primitives;
rendering circuitry configured to render primitives from the stream of primitives; and
a display operable to display the rendered primitives.

5. A method of operating a graphics processing system in which a scene to be rendered is divided into a plurality of sub-regions for rendering, each sub-region including a respective area of the scene to be rendered, the method comprising:
preparing lists of primitives for rendering, each list of primitives listing primitives for rendering for one or more sub-regions of the scene;
generating indices for primitives that are included in the primitive lists; and
associating with each graphics primitive that is listed in a primitive list, an index for the primitive;
the method further comprising:
when rendering a sub-region of the scene, selecting from a primitive list a next primitive to be rendered for that sub-region of the scene;
wherein the primitive selection step uses plural different primitive lists simultaneously, determines which primitive from the plural different primitive lists should be rendered next for a sub-region of the scene using the indices associated with the graphics primitives in the primitive lists, and selects the primitive determined to be the primitive that should be rendered next as the primitive to render next for that sub-region of the scene.

6. The method of claim 5, further comprising: using the primitive indexes to identify when a primitive having an index that has already been passed for rendering for the sub-region of the scene arises, and, in that event, selecting a different primitive for rendering for the sub-region of the scene.

7. The method of claim 5, further comprising: when the plural primitive lists being used to select a next primitive to be rendered include the same primitive more than once, selecting the primitive for rendering only once.

8. A method of rendering a group of graphics primitives for display in a graphics processing system, comprising:
allocating an index to each primitive in the group of primitives;
distributing the primitives from the group of primitives across multiple geometry processors of the graphics processing system;
processing the primitives in the geometry processors, wherein different primitives from the group of primitives are processed by different geometry processors of the multiple geometry processors;

recombining the primitives that have been processed in the geometry processors into a single stream of primitives using the indices allocated to the primitives;
rendering primitives from the stream of primitives; and
displaying the rendered primitives.

9. A non-transitory, computer-readable storage medium, said storage medium storing computer software code which, when implemented on a graphics processing system, performs a method of operating a graphics processing system in which a scene to be rendered is divided into a plurality of sub-regions for rendering, each sub-region including a respective area of the scene to be rendered, the method comprising:
preparing lists of primitives for rendering, each list of primitives listing primitives for rendering for one or more sub-regions of the scene;
generating indices for primitives that are included in the primitive lists; and
associating with each graphics primitive that is listed in a primitive list, an index for the primitive;
the method further comprising:
when rendering a sub-region of the scene, selecting from a primitive list a next primitive to be rendered for that sub-region of the scene;
wherein the primitive selection step uses plural different primitive lists simultaneously, determines which primitive from the plural different primitive lists should be rendered next for a sub-region of the scene using the indices associated with the graphics primitives in the primitive lists, and selects the primitive determined to be the primitive that should be rendered next as the primitive to render next for that sub-region of the scene.

10. A non-transitory, computer-readable storage medium, said storage medium storing computer software code which, when implemented on a graphics processing system, performs a method of rendering a group of graphics primitives for display in a graphics processing system, comprising:
allocating an index to each primitive in the group of primitives;
distributing the primitives from the group of primitives across multiple geometry processors of the graphics processing system;
processing the primitives in the geometry processors, wherein different primitives from the group of primitives are processed by different geometry processors of the multiple geometry processors;
recombining the primitives that have been processed in the geometry processors into a single stream of primitives using the indices allocated to the primitives;
rendering primitives from the stream of primitives; and
displaying the rendered primitives.

* * * * *